(12) United States Patent
Kageshima et al.

(10) Patent No.: US 6,205,555 B1
(45) Date of Patent: Mar. 20, 2001

(54) PROCESSOR POWER CONSUMPTION ESTIMATING SYSTEM, PROCESSOR POWER CONSUMPTION ESTIMATING METHOD, AND STORAGE MEDIUM STORING PROGRAM FOR EXECUTING THE PROCESSOR POWER CONSUMPTION ESTIMATING METHOD

(75) Inventors: Atsushi Kageshima; Masayoshi Tachibana, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/250,438

(22) Filed: Feb. 16, 1999

(30) Foreign Application Priority Data

Feb. 16, 1998 (JP) .................................. 10-033235

(51) Int. Cl.[7] ................. G06F 1/26; G06F 1/32
(52) U.S. Cl. ............................. 713/300; 713/320
(58) Field of Search ..................... 713/300, 320, 713/322, 323, 324, 321; 709/100; 711/118, 125, 126; 712/240; 717/5; 703/13

(56) References Cited

U.S. PATENT DOCUMENTS

| | | | |
|---|---|---|---|
| 5,724,591 | * | 3/1998 | Hara et al. . |
| 5,941,991 | * | 8/1999 | Kageshima . |
| 6,092,183 | * | 7/2000 | Takewa et al. . |
| 6,096,089 | * | 8/2000 | Kageshima . |

FOREIGN PATENT DOCUMENTS

| | | |
|---|---|---|
| 9-218731 | 8/1997 | (JP) . |
| 10-40144 | 2/1998 | (JP) . |
| 10-254944 | 9/1998 | (JP) . |

\* cited by examiner

Primary Examiner—Gopal C. Ray
(74) Attorney, Agent, or Firm—Foley & Lardner

(57) ABSTRACT

The present invention provides a processor power consumption estimating method comprising the steps of receiving a source program prior to compile of an execution program for a processor, tracing the source program, receiving trace information and detecting whether or not the processor is stalled when the instructions are executed, receiving trace information to which stall information is added and estimating power consumption when the instructions are executed, and outputting an estimated result of the power consumption, wherein the stall information are detected by looking up operation information of the processor in the stall detecting step, and the power consumption in the processor is estimated by looking up a library in which power consumption for each instruction is collected with regard to the stall information in the estimating step. The present invention provides also a power consumption estimating system for executing this processor power consumption estimating method, and a storage medium storing a program to perform this this processor power consumption estimating method.

15 Claims, 24 Drawing Sheets

FIG.7

| | SOURCE PROGRAM |
|---|---|
| <br>1<br>2<br>3<br>4<br>5<br>6<br>7 | #include <stdio.h><br>int a,b,c,x;<br>main( ) {<br>a=0;<br>b=2;<br>while(a<b) {<br>c=a*2;<br>x=min(b,c);<br>printf("min=%d¥n",x);<br>a=a+1;<br>}} |

FIG.8

| EXECUTION SEQUENCE | SOURCE PROGRAM |
|---|---|
| 1 | a=0; |
| 2 | b=2; |
| 3 | while(a<b) { |
| 4 | c=a*2; |
| 5 | x=min(b,c); |
| 6 | printf("min=%d¥n",x); |
| 7 | a=a+1; |
| 3' | while(a<b) { |
| 4' | c=a*2; |
| 5' | x=min(b,c); |
| 6' | printf("min=%d¥n",x); |
| 7' | a=a+1; |
| 3" | while(a<b) |

FIG.9

| EXECUTION SEQUENCE | SOURCE PROGRAM | INSTRUCTION CACHE STATE | DATA CACHE STATE |
|---|---|---|---|
| 1 | a=0; | MEMORY READ | MEMORY READ |
| 2 | b=2; | MEMORY READ | MEMORY READ |
| 3 | while(a<b) { | MEMORY READ | MEMORY READ |
| 4 | c=a*2; | MEMORY READ | MEMORY READ |
| 5 | x=min(b,c); | MEMORY READ | MEMORY READ |
| 6 | printf("min=%d¥n",x); | MEMORY READ | MEMORY READ |
| 7 | a=a+1; | MEMORY READ | MEMORY READ |
| 3' | while(a<b) { | CACHE READ | CACHE READ |
| 4' | c=a*2; | CACHE READ | CACHE READ |
| 5' | x=min(b,c); | CACHE READ | CACHE READ |
| 6' | printf("min=%d¥n",x); | CACHE READ | CACHE READ |
| 7' | a=a+1; | CACHE READ | CACHE READ |
| 3" | while(a<b) | CACHE READ | CACHE READ |

| TYPE | NORMAL | | | EXECUTION SPEED PRECEDENCE | | |
|---|---|---|---|---|---|---|
| | NUMBER OF INSTRUCTION | USE CYCLE | POWER CONSUMPTION | NUMBER OF INSTRUCTION | USE CYCLE | POWER CONSUMPTION |
| EQUATION 1 | 3 | 8 | 700mW | 3 | 8 | 700mW |
| EQUATION 2 | 6 | 17 | 1500mW | 6 | 17 | 1500mW |
| FUNCTION 1 | 50 | 100 | 7500mW | 60 | 80 | 7200mW |
| FUNCTION 2 | 35 | 80 | 5200mW | 70 | 75 | 5250mW |

| TYPE | CODE AMOUNT PRECEDENCE | | |
|---|---|---|---|
| | NUMBER OF INSTRUCTION | USE CYCLE | POWER CONSUMPTION |
| EQUATION 1 | 3 | 8 | 700mW |
| EQUATION 2 | 6 | 17 | 1500mW |
| FUNCTION 1 | 40 | 130 | 8300mW |
| FUNCTION 2 | 30 | 81 | 5100mW |

| ITEM | | | NUMBER OF INSTRUCTION | | | | USE CYCLE | | | |
|---|---|---|---|---|---|---|---|---|---|---|
| DATA READING DESTINATION | | | MEMORY | MEMORY | CACHE | CACHE | MEMORY | MEMORY | CACHE | CACHE |
| INSTRUCTION READING DESTINATION | | | MEMORY | CACHE | MEMORY | CACHE | MEMORY | CACHE | MEMORY | CACHE |
| EQUATION | Y=X | | 1 | 1 | 1 | 1 | 8 | 3 | 5 | 1 |
| | X*Y | | 1 | 1 | 1 | 1 | 5 | 1 | 5 | 1 |
| | X+Y | | 1 | 1 | 1 | 1 | 5 | 1 | 5 | 1 |
| FUNCTION | while | | 12 | 12 | 12 | 12 | 62 | 20 | 50 | 13 |
| | min | | 7 | 7 | 7 | 7 | 35 | 12 | 30 | 9 |
| | printf | | 10 | 10 | 10 | 10 | 41 | 12 | 41 | 12 |

| ITEM | | | POWER CONSUMPTION (mW) | | | | NUMBER OF DATA |
|---|---|---|---|---|---|---|---|
| DATA READING DESTINATION | | | MEMORY | MEMORY | CACHE | CACHE | |
| INSTRUCTION READING DESTINATION | | | MEMORY | CACHE | MEMORY | CACHE | |
| EQUATION | Y=X | | 450 | 300 | 350 | 200 | 1 |
| | X*Y | | 500 | 280 | 500 | 280 | 0 |
| | X+Y | | 420 | 250 | 420 | 250 | 0 |
| FUNCTION | while | | 7000 | 2800 | 6200 | 1600 | 2 |
| | min | | 4000 | 1200 | 3500 | 1000 | 1 |
| | printf | | 5000 | 1250 | 5000 | 1250 | 0 |

| SOURCE PROGRAM | INSTRUCTION CACHE STATE | DATA CACHE STATE | POWER CONSUMPTION(mW) |
|---|---|---|---|
| a=0; | MEMORY READ | MEMORY READ | 350 |
| b=2; | MEMORY READ | MEMORY READ | 350 |
| while(a<b) { | MEMORY READ | MEMORY READ | 6200 |
| c=a*2; | MEMORY READ | MEMORY READ | 500 |
| x=min(b,c); | MEMORY READ | MEMORY READ | 3500 |
| printf("min=%d¥n",x); | MEMORY READ | MEMORY READ | 5000 |
| a=a+1; | MEMORY READ | MEMORY READ | 420 |
| while(a<b) { | CACHE READ | CACHE READ | 1600 |
| c=a*2; | CACHE READ | CACHE READ | 280 |
| x=min(b,c); | CACHE READ | CACHE READ | 1000 |
| printf("min=%d¥n",x); | CACHE READ | CACHE READ | 1250 |
| a=a+1; | CACHE READ | CACHE READ | 250 |
| while(a<b) | CACHE READ | CACHE READ | 1600 |
| TOTAL | | | 22300 |

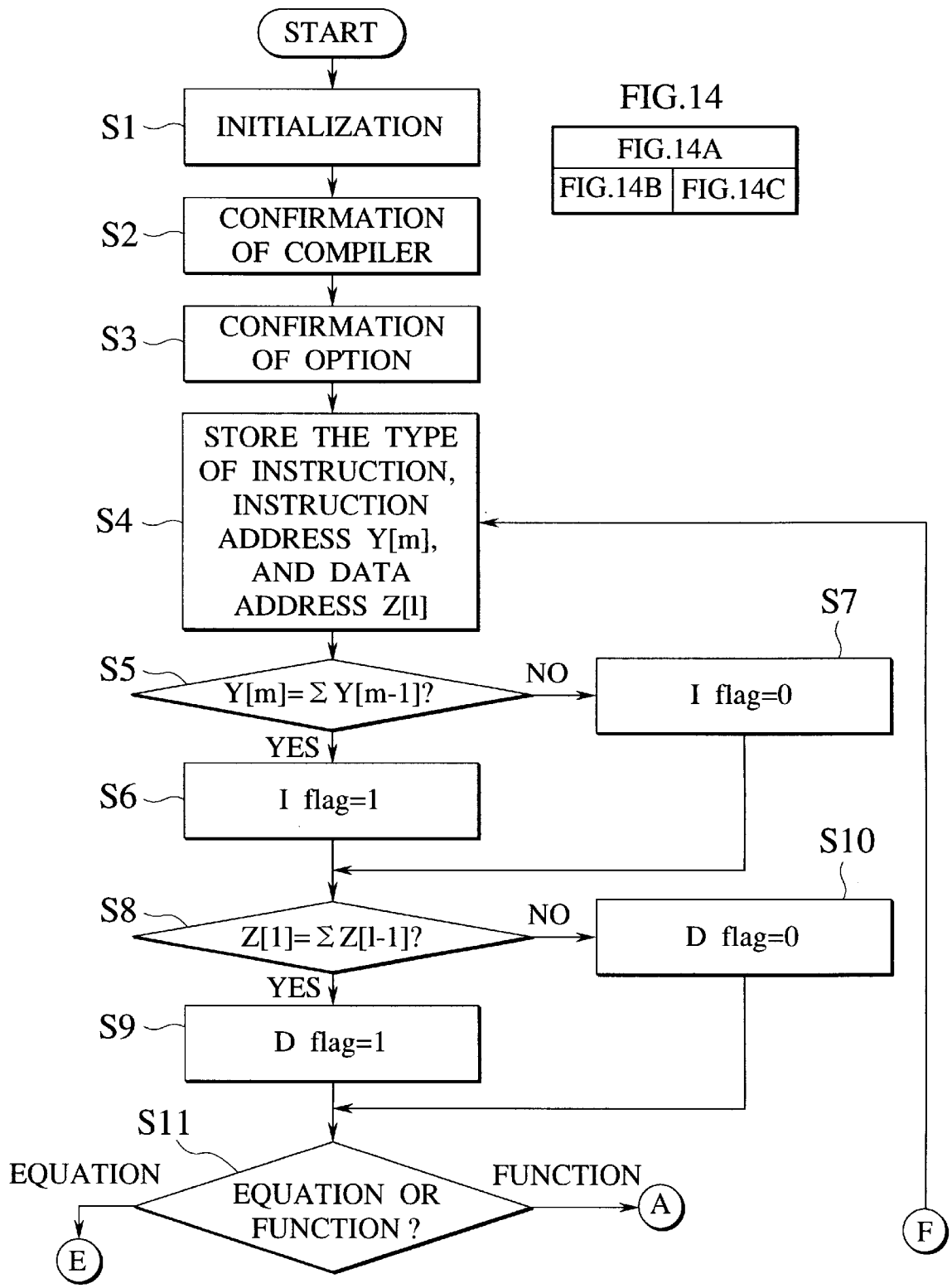

FIG.15

| ITEM | | NUMBER OF INSTRUCTION | | | | | | | | | USE CYCLE | | | | | | | | | |
|---|---|---|---|---|---|---|---|---|---|---|---|---|---|---|---|---|---|---|---|---|
| DATA READING DESTINATION | | MEMORY | | MEMORY | | CACHE | | MEMORY | | CACHE | | MEMORY | | MEMORY | | CACHE | | MEMORY | | CACHE |
| INSTRUCTION READING DESTINATION | | MEMORY | | CACHE | | MEMORY | | CACHE | | CACHE | | MEMORY | | CACHE | | MEMORY | | CACHE | | CACHE |
| | | min | max | min | max | min | max | min | max | min | max | min | max | min | max | min | max | min | max |
| EQUATION | Y=X | 1 | 1 | 1 | 1 | 1 | 1 | 1 | 1 | 1 | 1 | 8 | 8 | 3 | 3 | 5 | 5 | 1 | 1 |
| | X*Y | 1 | 1 | 1 | 1 | 1 | 1 | 1 | 1 | 1 | 1 | 5 | 5 | 1 | 1 | 5 | 5 | 1 | 1 |
| | X+Y | 1 | 1 | 1 | 1 | 1 | 1 | 1 | 1 | 1 | 1 | 5 | 5 | 1 | 1 | 5 | 5 | 1 | 1 |
| FUNCTION | while | 12 | 13 | 12 | 13 | 12 | 13 | 12 | 13 | 13 | 15 | 62 | 65 | 20 | 24 | 50 | 56 | 13 | 15 |
| | min | 7 | 8 | 7 | 8 | 7 | 8 | 7 | 8 | 9 | 10 | 35 | 40 | 12 | 16 | 30 | 38 | 9 | 10 |
| | printf | 10 | 11 | 10 | 11 | 10 | 11 | 10 | 11 | 12 | 13 | 41 | 47 | 12 | 16 | 41 | 45 | 12 | 13 |

| ITEM | | POWER CONSUMPTION (mW) | | | | | | | | | NUMBER OF DATA |
|---|---|---|---|---|---|---|---|---|---|---|---|
| DATA READING DESTINATION | | MEMORY | | MEMORY | | CACHE | | MEMORY | | CACHE | |
| INSTRUCTION READING DESTINATION | | MEMORY | | CACHE | | MEMORY | | CACHE | | CACHE | |
| | | min | max | min | max | min | max | min | max | min | max | |
| EQUATION | Y=X | 450 | 450 | 300 | 300 | 350 | 350 | 200 | 200 | | | 1 |
| | X*Y | 500 | 500 | 280 | 280 | 500 | 500 | 280 | 280 | | | 1 |
| | X+Y | 420 | 420 | 250 | 250 | 420 | 420 | 250 | 250 | | | 0 |
| FUNCTION | while | 7000 | 7700 | 2800 | 3500 | 6200 | 7000 | 1600 | 2000 | | | 2 |
| | min | 4000 | 4900 | 1200 | 1600 | 3500 | 4000 | 1000 | 1200 | | | 1 |
| | printf | 5000 | 6200 | 1250 | 1650 | 5000 | 5800 | 1250 | 1350 | | | 0 |

FIG.16

| SOURCE PROGRAM | MAXIMUM POWER CONSUMPTION(mW) | MINIMUM POWER CONSUMPTION(mW) |
|---|---|---|
| a=0; | 350 | 350 |
| b=2; | 350 | 350 |
| while(a<b) { | 7000 | 6200 |
| c=a*2; | 500 | 500 |
| x=min(b,c); | 4000 | 3500 |
| printf("min=%d¥n",x); | 5800 | 5000 |
| a=a+1; | 420 | 420 |
| while(a<b) { | 2000 | 1600 |
| c=a*2; | 280 | 280 |
| x=min(b,c); | 1200 | 1000 |
| printf("min=%d¥n",x); | 1350 | 1250 |
| a=a+1; | 250 | 250 |
| while(a<b) | 2000 | 1600 |
| TOTAL | 25500 | 22300 |

FIG.19

| INSTRUCTION | USE DATA SEQUENCE | DATA CACHE STATE AFTER EXECUTION | GLOBAL DATA |
|---|---|---|---|
| A | X,1,2,3,1,2,4,5,6,7,3,4,8,9,Y,10,8,9,11,12,13,14,10,11 | 3,4,8,9,Y,12,13,14,10,11 | Y,Z |
| B | 1,2,3,4,5,Y,2,3,5,6,7,1,8,9,Z,3,4,X,Y,9,11,12 | 1,8,Z,3,4,X,Y,9,11,12 | X,Y,Z |
| C | Z | | Z |

FIG.20

| INSTRUCTION EXECUTION ORDER |
|---|
| A,B,C |

FIG.22

| EXECUTION ORDER | A | | B | | | | C |
|---|---|---|---|---|---|---|---|
| USE DATA | X ... | Y ... | Y ... | Z ... | X ... | Y ... | Z |
| DATA READING DESTINATION | MEMORY | MEMORY | MEMORY | MEMORY | MEMORY | MEMORY | CACHE |
| DATA CACHE STRUCTURE (new) | X | — | a-9 / Y | b-5 / Y | b-9 / Z | b-4 / X | b-12 / Z |
| | — | — | a-8 / a-9 | b-4 / b-5 | b-8 / b-9 | b-3 / b-4 | b-11 / b-12 |
| | — | — | a-4 / a-8 | b-3 / b-4 | b-1 / b-8 | Z / b-3 | b-9 / b-11 |
| | — | — | a-3 / a-4 | b-2 / b-3 | b-7 / b-1 | b-9 / Z | Y / b-9 |
| | — | — | a-7 / a-3 | b-1 / b-2 | b-6 / b-7 | b-8 / b-9 | X / Y |
| | — | — | a-6 / a-7 | a-11 / b-1 | b-5 / b-6 | b-1 / b-8 | b-4 / X |
| | — | — | a-5 / a-6 | a-10 / a-11 | b-3 / b-5 | b-7 / b-1 | b-3 / b-4 |
| | — | — | a-4 / a-5 | a-14 / a-10 | b-2 / b-3 | b-6 / b-7 | Z / b-3 |
| | — | — | a-2 / a-4 | a-13 / a-14 | Y / b-2 | b-5 / b-6 | b-9 / b-9 |
| (old) | — | — | a-1 / a-2 | a-12 / a-13 | b-4 / Y | b-2 / b-5 | b-8 / b-8 |

FIG.23

| INSTRUCTION EXECUTION ORDER |
|---|
| B, C, A |

FIG.24

| EXECUTION ORDER | B | | | | | C | | A | |
|---|---|---|---|---|---|---|---|---|---|
| USE DATA | ...Y | ...Z | ...Y | X | Y... | Z | X ...Y | X ...Y | |
| DATA READING DESTINATION | MEMORY | MEMORY | MEMORY | MEMORY | MEMORY | CACHE | CACHE | CACHE | MEMORY |
| DATA CACHE STRUCTURE (new) | b-5 Y | b-9 Z | b-4 X | Y | b-12 Z | X | a-9 Y |
| | b-4 b-5 | b-8 b-9 | b-3 b-4 | X | b-11 b-12 | Z | a-8 a-9 |
| | b-3 b-4 | b-1 b-8 | Z b-3 | b-4 | b-9 b-11 | b-12 | a-4 a-8 |
| | b-2 b-3 | b-7 b-1 | b-9 Z | b-3 | Y b-9 | b-11 | a-3 a-4 |
| | b-1 b-2 | b-6 b-7 | b-8 b-9 | Z | X Y | b-9 | a-7 a-3 |
| | — b-1 | b-5 b-6 | b-1 b-8 | b-9 | b-4 X | Y | a-6 a-7 |
| | — — | b-3 b-5 | b-7 b-1 | b-8 | b-3 b-4 | b-4 | a-5 a-6 |
| | — — | b-2 b-3 | b-6 b-7 | b-1 | Z b-3 | b-3 | a-4 a-5 |
| | — — | Y b-2 | b-5 b-6 | b-7 | b-9 Z | Z | a-2 a-4 |
| DATA CACHE STRUCTURE (old) | — — | b-4 Y | b-2 b-5 | b-6 | b-8 b-9 | b-9 | a-1 a-2 |

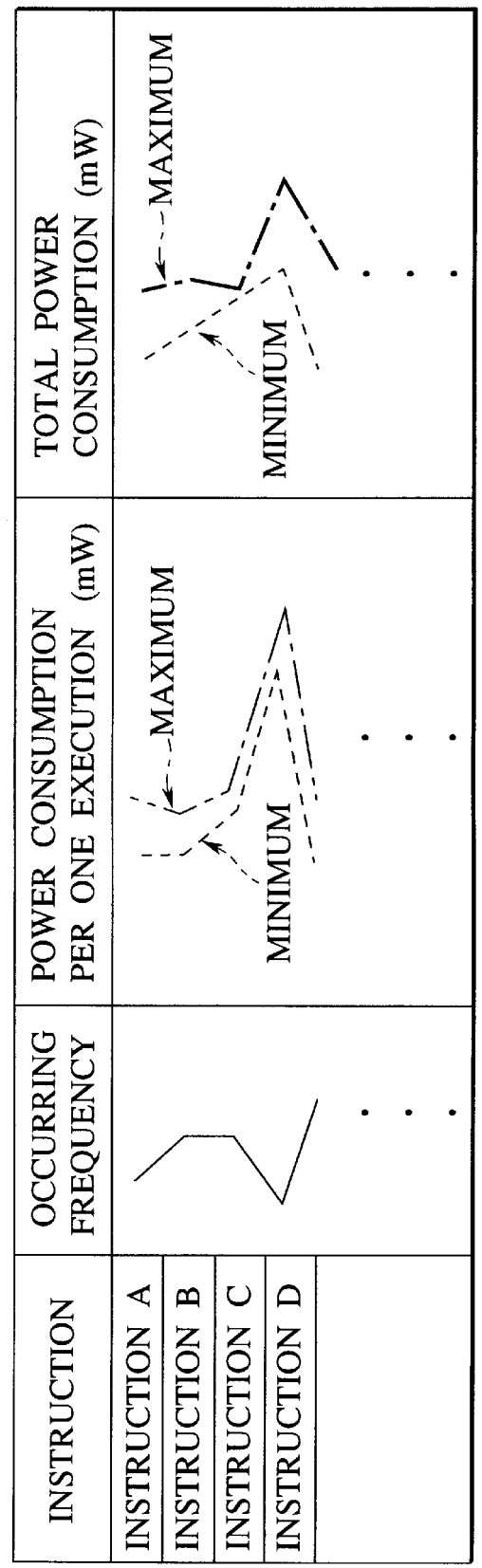

FIG. 27

| INSTRUCTION | OCCURRING FREQUENCY | DATA CACHE MISS FREQUENCY | TOTAL POWER CONSUMPTION |
|---|---|---|---|
| INSTRUCTION A | ▫ | | |
| INSTRUCTION B | ▯ | | |
| INSTRUCTION C | ▯ | | |
| INSTRUCTION D | ▫ | | |
| ... | | ... | ... |

FIG. 28

| LOWER HIERARCHY OF THE INSTRUCTION D | OCCURRING FREQUENCY |
|---|---|
| INSTRUCTION D-1 | 1200 |
| INSTRUCTION D-2 | 400 |
| INSTRUCTION D-3 | 650 |
| INSTRUCTION D-4 | 500 |
| ... | ... |

| INSTRUCTION | CONSUMPTION POWER (mW) |
|---|---|
| INSTRUCTION A | 600 |
| INSTRUCTION B | 1500 |
| INSTRUCTION C | 1650 |
| INSTRUCTION D | 3750 |
| ... | ... |

PROCESSOR POWER CONSUMPTION ESTIMATING SYSTEM, PROCESSOR POWER CONSUMPTION ESTIMATING METHOD, AND STORAGE MEDIUM STORING PROGRAM FOR EXECUTING THE PROCESSOR POWER CONSUMPTION ESTIMATING METHOD

BACKGROUND OF THE INVENTION

1. Field of the Invention

The present invention relates to a processor power consumption estimating system, a processor power consumption estimating method, and a storage medium from which a processor power consumption estimating program can be read out. More particularly, the present invention relates to a power consumption estimating technology for estimating power consumption in a microprocessor with good precision based on a source program which is described by a programmer.

2. Description of the Related Art

In order to select type of a package into which a processor is incorporated and a battery capacity employed in the processor, power consumption is taken account when instructions are executed. As a means for evaluating power consumption in the processor, there is a system in which, after a processor is assumed virtually, the power consumption is calculated by simulating operations of the processor when an execution program is carried out by the processor. FIG. 1 is a block diagram showing a configuration of a simulation system. First, this simulation system receives a source program sequence 1 described by a programmer. This source program is a program which is at a function level and described by a source code. The source code is a program prior to compile. More particularly, the source code is described by a higher level language such as C language, Pascal, etc. and can be read by the human being. The source program sequence 1 is converted into an assembly code 3 by a compiler 2. The assembly code 3 is converted into an input signal 5, which is operated on the processor at a gate/transistor level, by a gate/transistor level converter 4. A gate/transistor level simulator 6 can estimate the power consumption 7A with high precision by executing a simulation at the gate/transistor level by using the gate/transistor level input signal 5.

In this manner, in the above simulation system, the source program 1, which is described by the programmer at the function level, is converted into the input signal 5 which is operated on the actual processor at the gate/transistor level. The power consumption is then calculated by simulating the actual operation in the processor at the gate/transistor level by using the gate/transistor level input signal 5. Therefore, estimation precision of the power consumption by using the above simulation system can be improved extremely high. For this reason, it is feasible to estimate the power consumption in the processor by applying the already-described program to this simulation system. However, since an execution speed of the simulation system is slow, it is not practical to employ the simulation system in the course of programming.

As a method of avoiding the problem that the execution speed of the above simulation system is slow, an estimation system which can estimate the power consumption directly from the assembly code has been proposed. This estimation system can compile the source program described by the programmer to the assembly code, and then estimate the power consumption with the use of the assembly code. Since the power consumption can be estimated from the assembly code without simulation of the operation in the processor, the higher execution speed can be achieved. Accordingly, it is possible to estimate quickly the power consumption of the processor with high precision by using the estimation system at the early stage of program design. As a result, in case a plurality of programs each having the same function are described and then the power consumption of the processor is compared with each other when the programs are executed, this estimation system is very effective. However, since the function level being programmed by the programmer and the assembly level do not always correspond to each other one by one, it is difficult for the programmer to correct the source program directly in the middle of programming, based on the estimated result of the power consumption being derived from the assembly code.

SUMMARY OF THE INVENTION

The present invention has been made in view of the above circumstances and it is an object of the present invention to provide a processor power consumption estimating system which is capable of estimating power consumption in a microprocessor directly based on a source program which is described by a programmer, a processor power consumption estimating method, and a storage medium capable of mechanical read-out that stores a processor power consumption estimating program.

In order to achieve the above object, according to a first aspect of the present invention, there is provided a power consumption estimating system for estimating power consumption in a processor when instructions contained in an execution program are executed, comprising means for tracing a source program of the execution program; means for receiving trace information and detecting whether or not the processor is put into a stall when the instructions are executed; and means for receiving trace information to which stall information is added and estimating power consumption when the instructions are executed; wherein the detecting means detects the stall information by looking up operation information of the processor, and the estimating means estimates the power consumption in the processor by looking up a library in which power consumption for each instruction is collected with regard to the stall information.

In the first aspect of the present invention, the power consumption for each instruction is calculated previously with regard to the stall information and stored as a library, and then the power consumption for each instruction can be detected by referring to the library based on the trace information to which the stall information are added. The power consumption of the processor can be estimated precisely and quickly by summing up the power consumption for each instruction when the instructions contained in the execution program are executed. Then, this estimated result can be fed back quickly to the programmer who programs the source program. Since the power consumption can be estimated from the source program prior to compile, it is possible for the programmer to execute the programming with regard to the estimated result. As a result, the lower power consumption of the processor can be achieved.

According to a second aspect of the present invention, there is provided a power consumption estimating system for estimating power consumption in a processor when instructions contained in an execution program are executed, comprising means for statically expanding a source program of the execution program; and means for receiving the source program which has been expanded statically and estimating power consumption when the instructions are executed; wherein the statically expanding means has information necessary for expansion of the source program and expands the source program based on expansion information, and the estimating means estimates the power consumption in the processor with reference to a library in which the power consumption for each instruction is collected with regard to information indicating whether or not the processor is put into a stall when the instructions are executed.

In the second aspect of the present invention, information necessary for the expansion of the source program can be provided previously to the statically expanding means. Accordingly, it is feasible to expand the source program without the actual simulation. In addition, the power consumption for the unfinished source program can be estimated.

According to a third aspect of the present invention, there is provided a power consumption estimating method of estimating power consumption in a processor when instructions contained in an execution program are executed, comprising the steps of receiving a source program of the execution program; tracing the source program; receiving trace information and detecting whether or not the processor is put into a stall when the instructions are executed; receiving trace information to which stall information is added and estimating power consumption when the instructions are executed; and outputting an estimated result of the power consumption; wherein the stall information are detected by looking up operation information of the processor in the detecting step, and the power consumption in the processor is estimated by looking up a library in which power consumption for each instruction is collected with regard to the stall information in the estimating step.

According to a fourth aspect of the present invention, there is provided a storage medium for storing a power consumption estimating program which estimates power consumption in a processor when instructions contained in an execution program are executed, the program comprising the steps of receiving a source program of the execution program; tracing the source program; receiving trace information and detecting whether or not the processor is put into a stall when the instructions are executed; receiving trace information to which stall information is added and estimating power consumption when the instructions are executed; and outputting an estimated result of the power consumption; wherein the stall information are detected by looking up operation information of the processor in the detecting step, and the power consumption in the processor is estimated by looking up a library in which power consumption for each instruction is collected with regard to the stall information in the estimating step.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 7 is a view showing an instruction sequence of a source program employed in the first embodiment of the present invention;

FIG. 8 is a view showing trace information for the source program in FIG. 7;

FIG. 9 is a view showing the trace information in FIG. 8 to which stall information are added;

FIG. 12 is a view showing the power consumption library for one equation/one function with respect to equations and functions contained in the source program sequence in FIG. 7, which is calculated by the processor power consumption estimating system in FIG. 10;

FIG. 13 is a view showing estimated results of the processor power consumption derived from the source program sequence in FIG. 7 by using the power consumption library for one equation/one function in FIG. 12;

FIGS. 14A, 14B and 14C are flowcharts showing process procedures in a stall information detecting algorithm employed in the first embodiment of the present invention;

FIG. 15 is a view showing a maximum/minimum power consumption library for one equation/one function with respect to the equations and the functions contained in the source program sequence in FIG. 7, which is calculated by the processor power consumption estimating system in FIG. 10;

FIG. 16 is a view showing estimated results of the processor power consumption derived from the source program sequence in FIG. 7 by using the maximum/minimum power consumption library for one equation/one function in FIG. 15;

FIG. 19 is a view showing instruction sequence of the source program employed in a data cache information detecting system according to the third embodiment of the present invention;

FIG. 20 is a view showing instruction execution order in FIG. 19;

FIG. 22 is a view showing change in internal states of the data cache when the instruction sequence in FIG. 19 is executed in the execution order in FIG. 20;

FIG. 23 is a view showing another instruction execution order in FIG. 19;

FIG. 24 is a view showing change in internal states of the data cache when the instruction sequence in FIG. 19 is executed in the execution order in FIG. 23;

FIG. 25 is a view showing a first example of an estimated result of the power consumption displayed by using GUI;

FIG. 26 is a view showing a second example of the estimated result of the power consumption displayed by using GUI;

FIG. 27 is a view showing a third example of the estimated result of the power consumption displayed by using GUI;

FIG. 28 is a view showing a fourth example of the estimated result of the power consumption displayed by using GUI;

DESCRIPTION OF THE PREFERRED EMBODIMENTS

Figure 1:
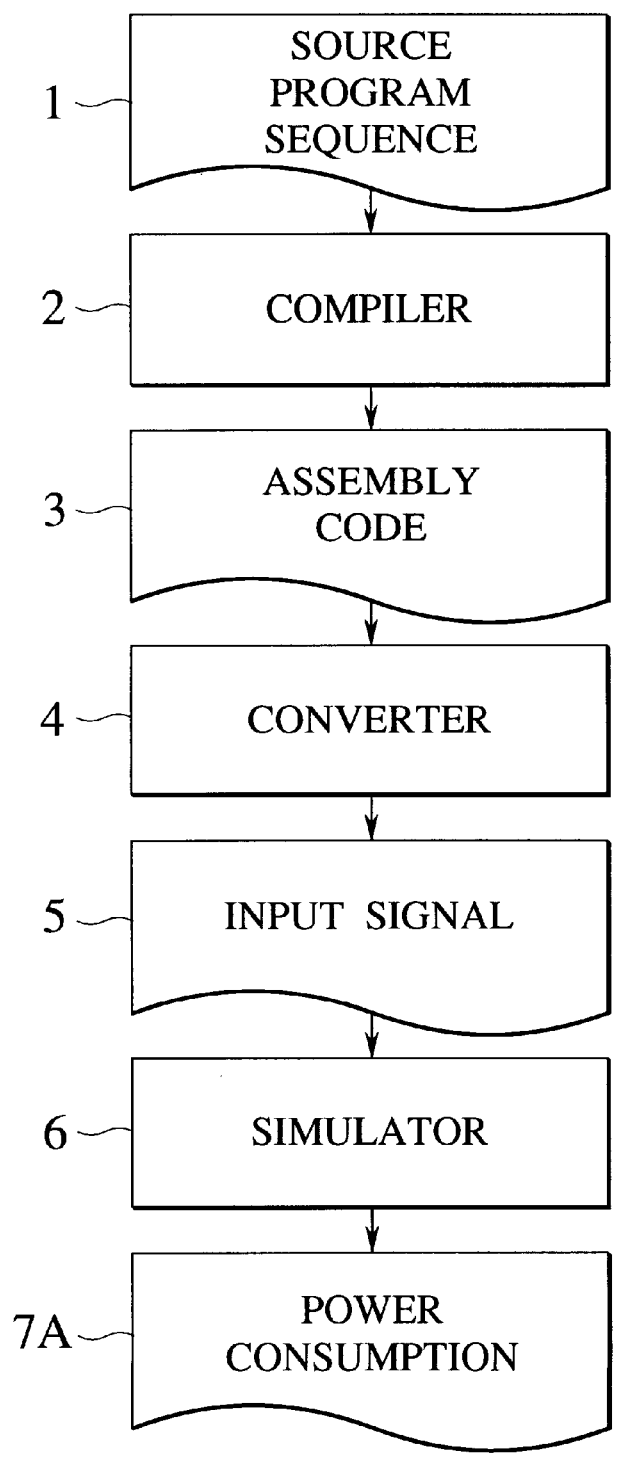
FIG. 1 is a block diagram showing a configuration of a simulation system which estimates power consumption in a processor.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(First Embodiment)

Figure 2:
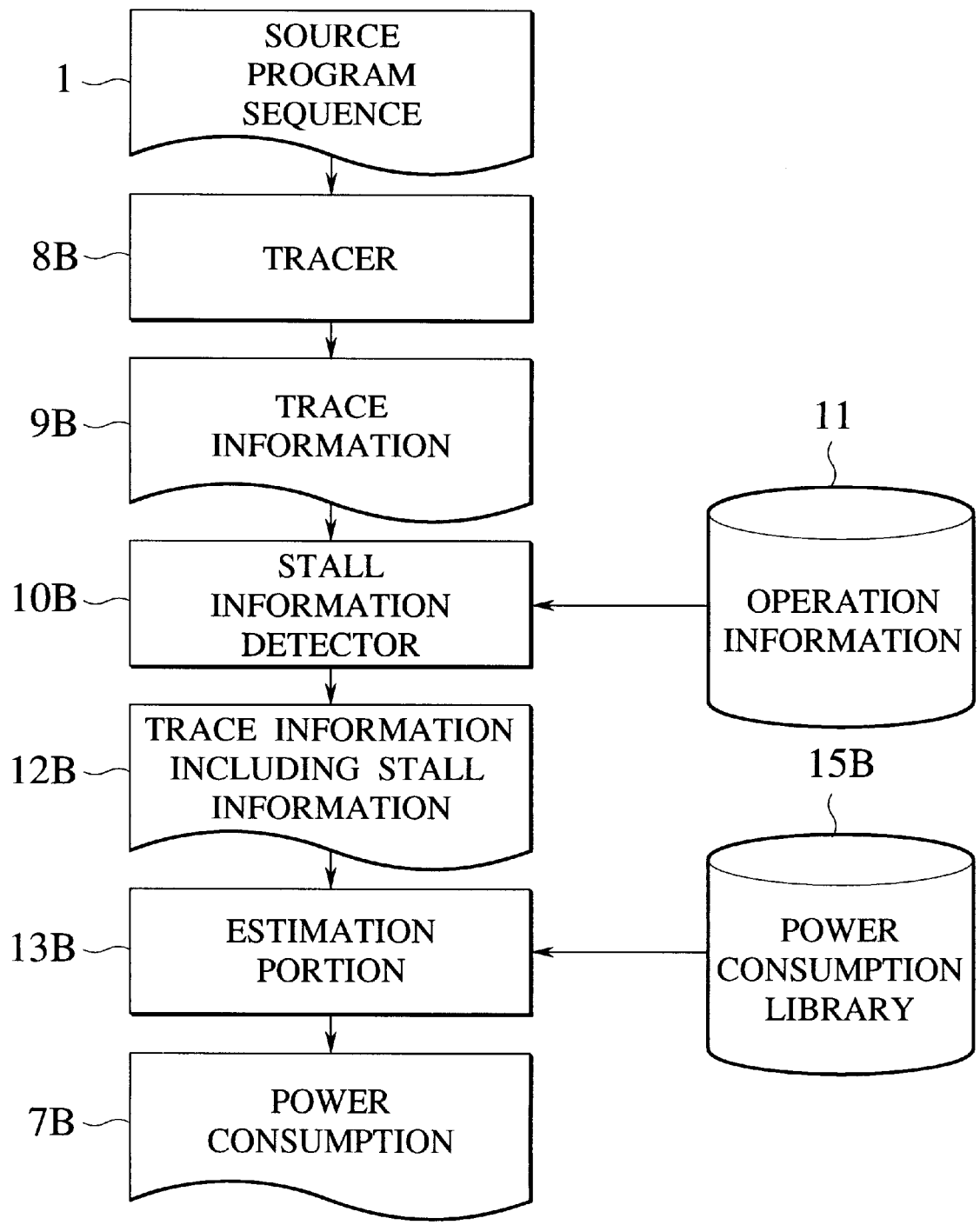
FIG. 2 is a block diagram showing a configuration of a processor power consumption estimating system according to a first embodiment of the present invention.

FIG. 2 is a block diagram showing a configuration of a processor power consumption estimating system according to a first embodiment of the present invention. The processor power consumption estimating system according to the first embodiment of the present invention comprises a tracer 8B for receiving a source program sequence 1 at a function level and generating trace information 9B of the source program sequence 1, a stall information detector 10B for receiving the trace information 9B and detecting stall information 12B of the execution program by using operation information 11 of the microprocessor, and an estimation portion 13B for estimating the power consumption 7B in instruction execution by using the trace information 12B including the stall information based on a power consumption library 15B for one equation/one function. As explained in the related art, the source program constituting the source program sequence 1 is a program which is at a function level and described by a source code. The source code is a program prior to compile. More particularly, the source code is a program which is described by a higher level language such as C language, Pascal, etc. and is read by the human being. The higher level language does not depend upon a particular computer and thus it can be described the most understandably for the human being. The programmer can program the source program by the higher level language. The execution program is a program which can be executed actually on the processor.

Next, a concrete example of an operation of the first embodiment will be explained with reference to the drawings hereunder. For simplicity of explanation, items are assumed as the premises in the following.

Figure 3:
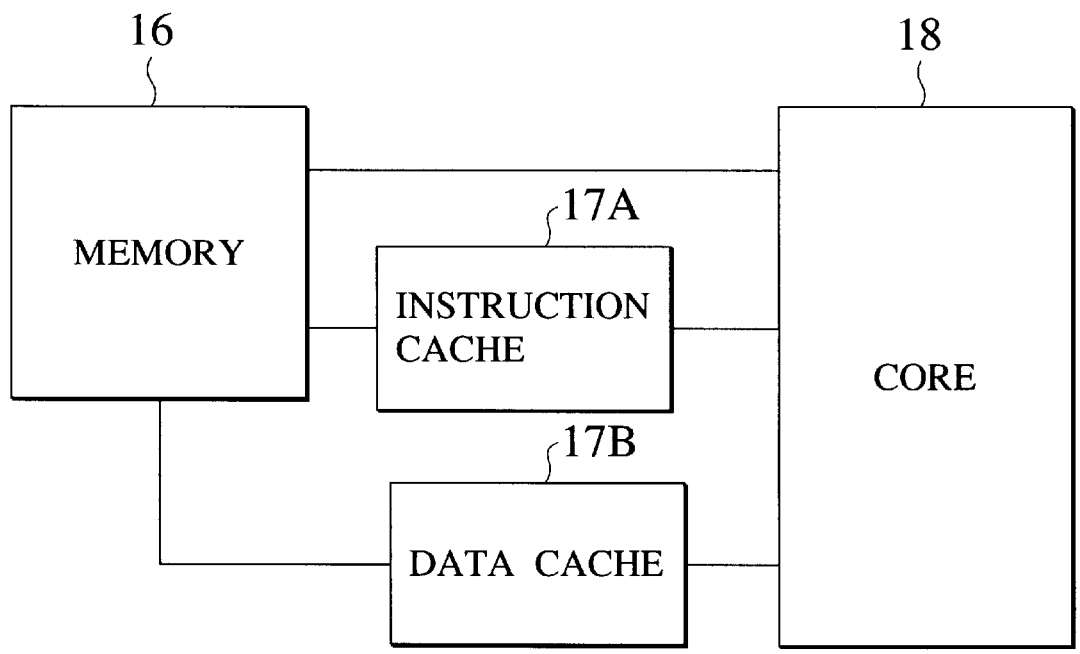
FIG. 3 is a block diagram showing a configuration of a processor whose power consumption is estimated in the first embodiment of the present invention.

(A) A processor as the object of power consumption estimation is a microprocessor shown in FIG. 3. The microprocessor shown in FIG. 3 comprises a memory 16 which stores instructions and data and is a low speed, large capacity, and low price memory; an instruction cache 17A and a data cache 17B both have higher speed, smaller capacity, and higher price than the memory 16; and a core 18 for executing control of them and various arithmetic operations. Assume that the number of instruction stored in the instruction cache 17A at a time is 50 and the number of data stored in the data cache 17B at a time is 10. Also, assume that both the instruction cache 17A and the data cache 17B can cancel the oldest instruction and data executed in the past respectively when overflow occurs.

(B) Assume that there is no instruction to clear the instruction cache 17A and the data cache 17B.

(C) Assume that the instruction which has a possibility to cause cache miss in the instruction cache 17A and the data cache 17B is only an assignment statement of the source code. The assignment statement of the source code is a load instruction in the assembly code.

Figure 4:
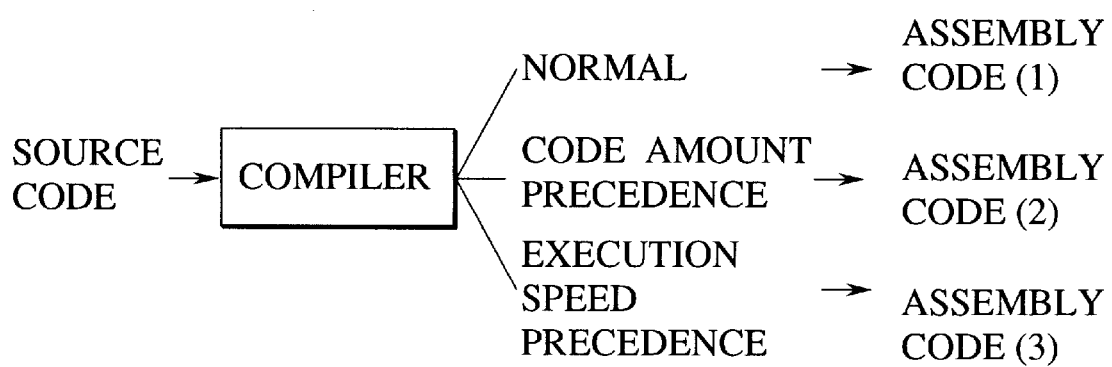
FIG. 4 is a view illustrating options of a compiler employed in the first embodiment of the present invention.
Figure 5:
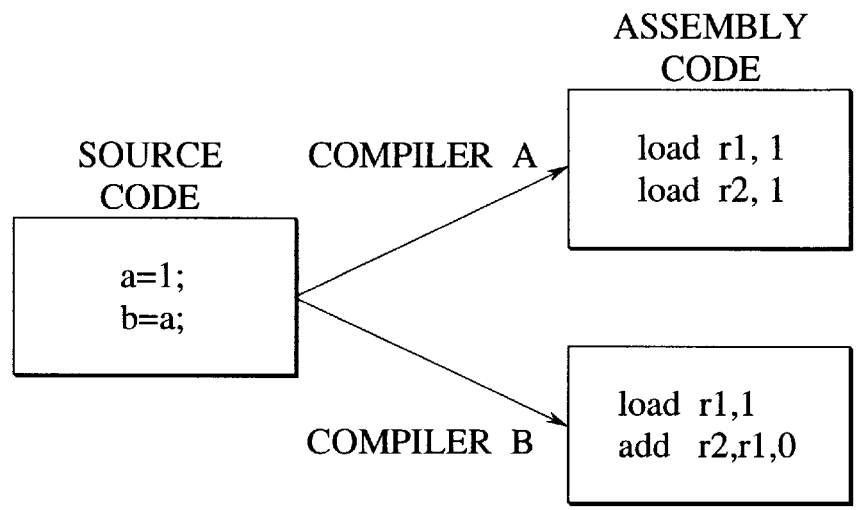
FIG. 5 is a view illustrating a correspondence between a source code and assembly codes if different compilers are employed.
Figure 6:
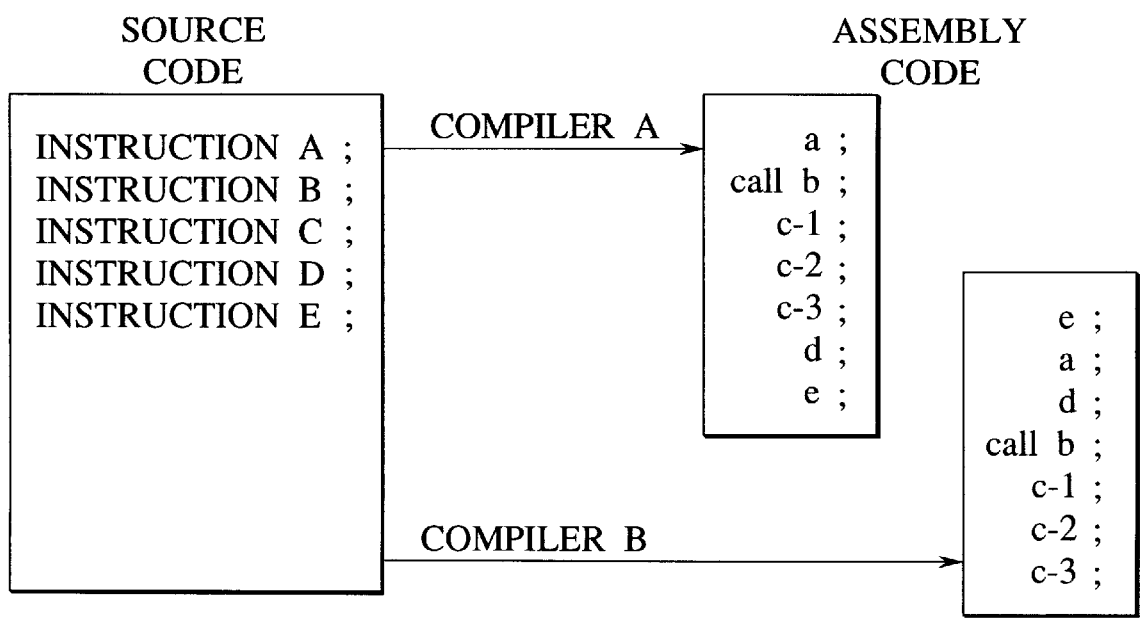
FIG. 6 is a view showing an example in which the execution order of instructions of the source code is changed if different compilers are employed.

(D) Assume that one type of compiler may be employed to convert the source code into the assembly code. As shown in FIG. 4, assume that three type of options, i.e., normal option, code amount precedence option, execution speed precedence option are prepared as options of a compiler. In the first embodiment, the reason for specifying type of the compiler and option of the compiler is given as follows. The source code described by the programmer is optimized by the compiler and then converted into the assembly code. Hence, if the different compiler is employed, the source code is converted into the different assembly code although the original source code is the same. That is, as shown in FIG. 5, the source code and the assembly code do not correspond one by one. For this reason, if the type of the compiler and the option of the compiler are specified previously, it is possible to correlate equations and functions, which are incorporated into the source code, with the assembly code which has been converted. However, as shown in FIG. 6, execution order of the source code may be changed in compile.

Next, while taking the source program sequence shown in FIG. 7 as an example, actually an operation of the first embodiment will be explained with reference to FIG. 2 hereunder. First, the source program sequence 1 shown in FIG. 7 is input. Then, the tracer 8B executes the instructions in the input source program sequence 1 one by one, then checks the execution order of these instructions, then outputs the trace information 9B. The trace information 9B of the source program sequence 1 shown in FIG. 7 is shown in FIG. 8. The execution order signifies the sequence by which these instructions are executed. Then, the stall information detector 10B receives the trace information 9B output from the tracer 8B, and then detects stall information by looking up the operation information 11 of the microprocessor. The operation information 11 of the microprocessor has already been obtained previously based on a configuration of the microprocessor in FIG. 3. For example, the operation information 11 are information as for a cache size in the processor, information indicating by what combination of instructions the stall is caused, and the like. The stall information detector 10B adds the detected stall information to the trace information 9B and then outputs the trace information 12B including the stall information. The stall information detector 10B detects the stall information by using a stall information detecting algorithm. The stall information signifies information concerning stall generation, e.g., what stall is caused if the instructions are executed one by one, data to be employed are stored in either the memory or the data cache, etc. FIG. 9 shows the trace information 12B which includes the stall information prepared based on the trace information 9B in FIG. 8. Here, assume that the stall is caused in the case where cache miss is caused. The stall information detecting algorithm will be described later.

Next, the estimation portion 13B receives the trace information 12B including stall information which are output from the stall information detector 10B, and then calculates the power consumption for each instruction by referring to data stored in the power consumption library 15B for one equation/one function. The estimation portion 13B then adds the power consumption for each instruction to output the power consumption 7B.

Figure 10:
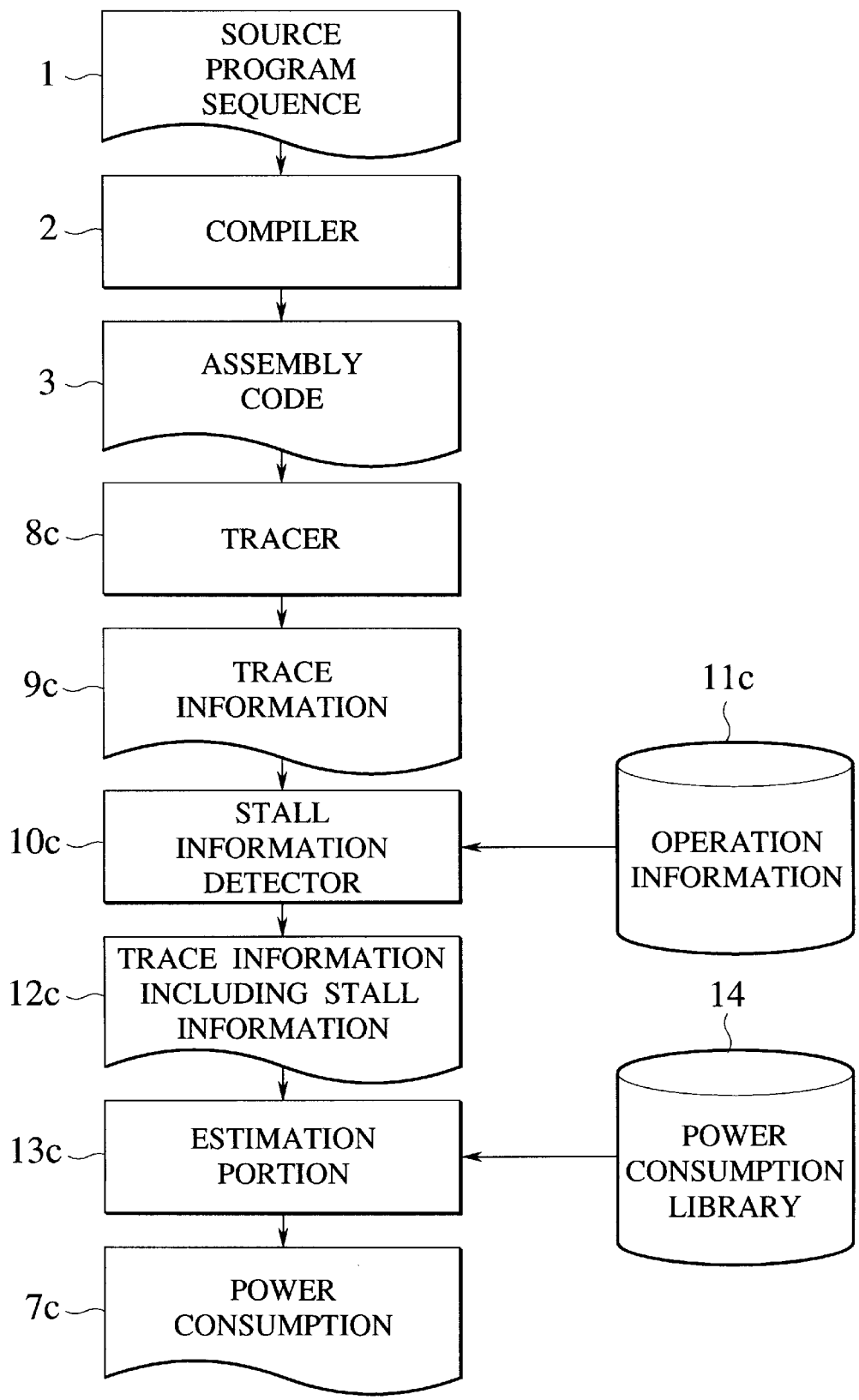
FIG. 10 is a block diagram showing a configuration of a processor power consumption estimating system which is employed when a power consumption library for one equation/one function employed in the first embodiment of the present invention is constructed.

The power consumption library 15B for one equation/one function is prepared by using a processor power consumption estimating system shown in FIG. 10, for example. This power consumption estimating system estimates the power consumption in the processor from the assembly code (References: Pat. Application Publication (KOKAI) Hei 9-218731, Pat. Application Publication (KOKAI) Hei 10-40144, and Pat. Application Publication (KOKAI) Hei 10-254944). The power consumption estimating system in FIG. 10 comprises the compiler 2 for converting the source program sequence 1 into the assembly code 3; a tracer 8C for receiving the assembly code 3 and then generating trace information 9C; a stall information detector 10C for receiving the trace information 9C, then detecting stall information of the execution program by using operation information 11C of the microprocessor, and then outputting trace information including stall information 12C; and an estimation portion 13C for receiving the trace information including stall information 12C and then calculating power consumption 7C in execution of the execution program by looking up data stored in a power consumption library 14 with regard to the stall information. As described above, if the type of the compiler and the option of the compiler are specified, it is possible to correlate the equations and the functions incorporated in the source code with the assembly code. Therefore, if the power consumption which corresponds to the equations and the functions contained in the source code is calculated previously by using power consumption estimating system shown in FIG. 10, the power consumption for one equation/one function can be prepared as a power consumption library.

Figure 11:
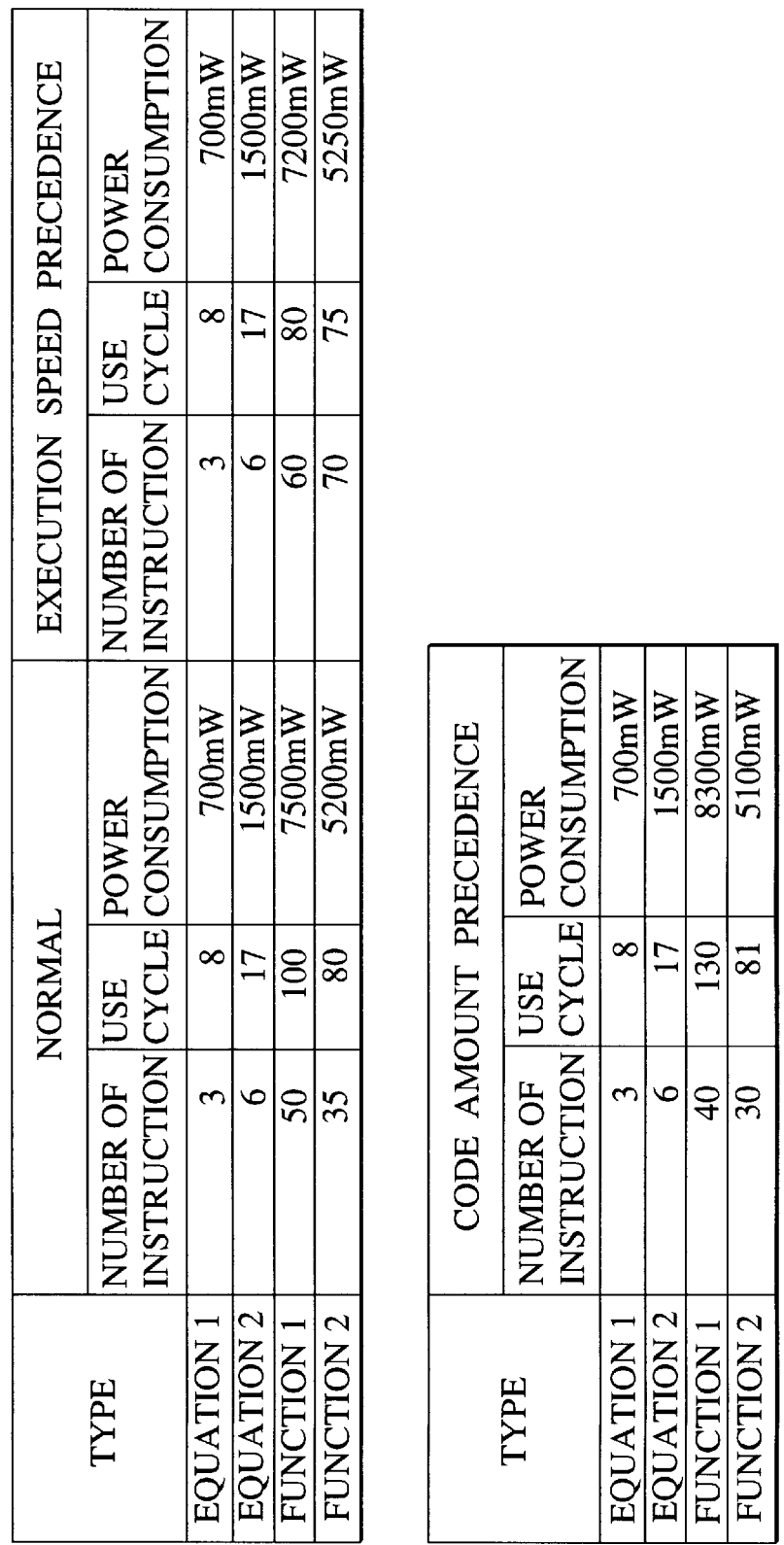
FIG. 11 is a view showing an example of the power consumption library for one equation/one function employed in the first embodiment of the present invention.

FIG. 11 shows an example of the power consumption library 15B for one equation/one function incorporated in the source program. In FIG. 11, the power consumption as for three options of the compiler is shown. FIG. 12 shows the power consumption library 15B for one equation/one function with respect to the equations and the functions contained in the source program sequence in FIG. 7, which is calculated by the processor power consumption estimating system in FIG. 10. In FIG. 12, information concerning data reading destination and instruction reading destination, which are the operation information 11 of the microprocessor in FIG. 3, are also shown. In addition, FIG. 13 shows estimated results of the power consumption derived from the source program sequence in FIG. 7 by using the power consumption library for one equation/one function in FIG. 12. It can be understood from FIG. 13 that the estimated results of the power consumption is 22300 mW.

Then, the stall information detecting algorithm will be explained hereunder. A general explanation of the stall will be first made and then an algorithm will be explained with reference to the drawings. The stall means a state in which the processor cannot execute the instruction due to any delay. For example, as the stall, there are the case where the instruction to be used is stored in a memory device which needs several clocks to load such instruction, the case where a particular instruction cannot be executed because of dependence between several instructions, etc. In this case, execution of the instruction is delayed in the processor over several clocks. As another example of delay, for example, there is a delay which is generated because it takes a lot of time to read the subsequently executed instruction from the memory. Normally this delay per se is called "stall". In addition, there is a delay which is generated because execution content of the succeeding instruction is changed depending upon execution result of the preceding instruction and therefore the next instruction cannot be executed until the execution result of the preceding instruction is defined. This delay is called "hazard". There is a delay which is generated when execution of the succeeding instruction cannot be started until the preceding instruction is completed since the resource necessary for instruction execution is limited. This delay is called "resource conflict". If the processor is stalled according to the above causes, such processor must spend the system clock excessively by several clocks. A predetermined amount of power is consumed in the excessive cycle of the system clock. Under such circumstances, the stall information must be calculated to estimate the power consumption more precisely.

Figure 14B:
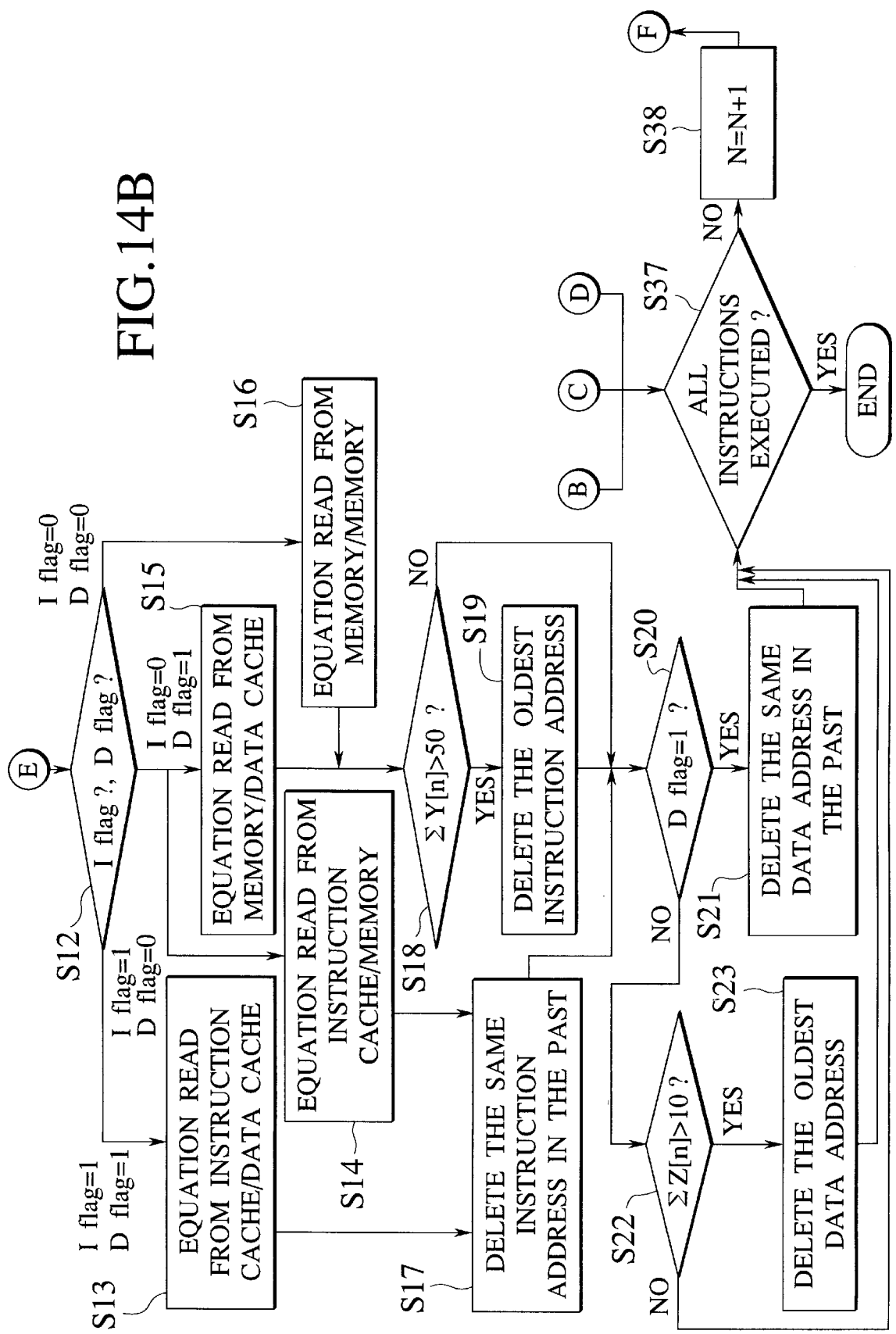
Figure 14C:
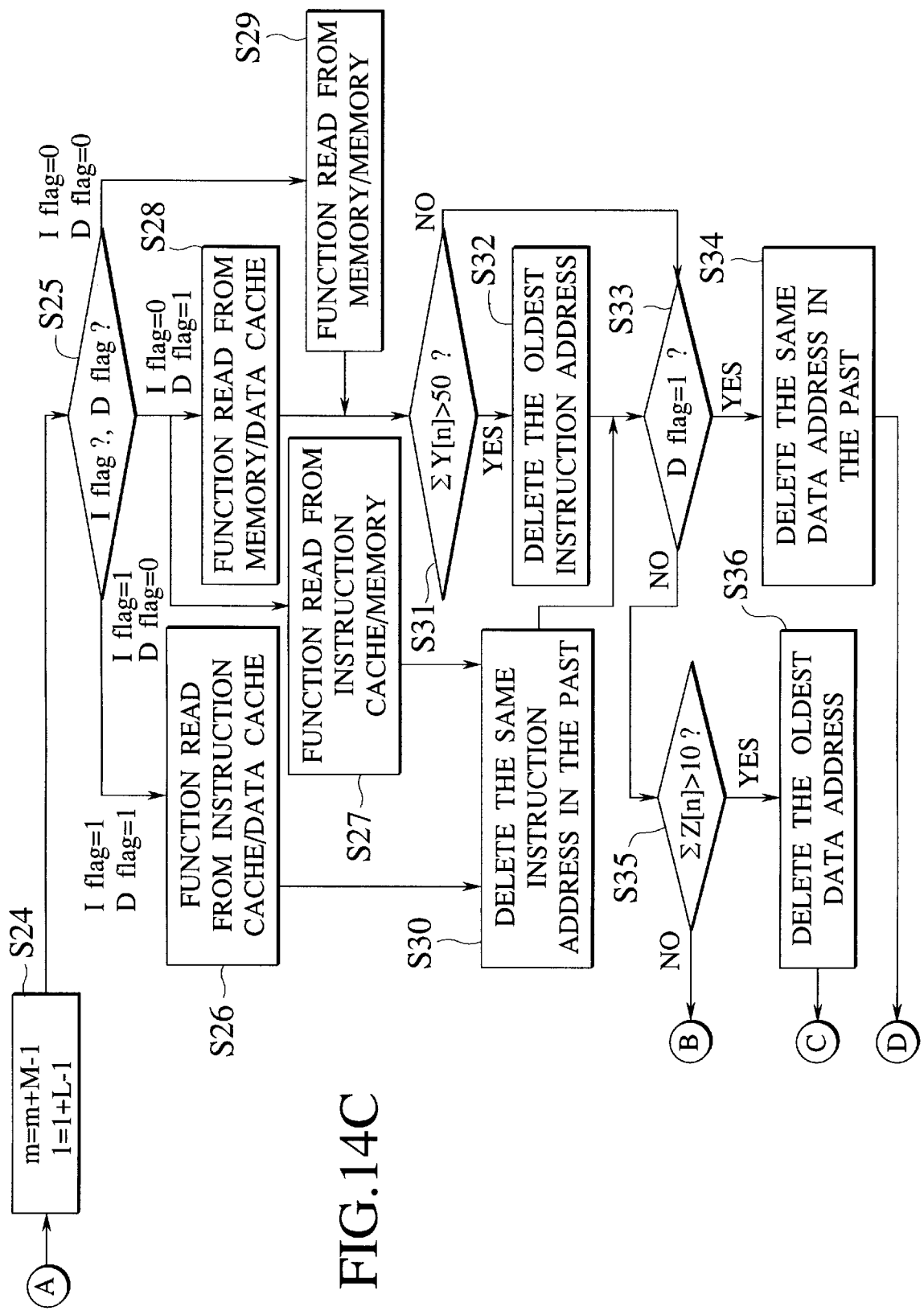

FIGS. 14A, 14B and 14C are flowcharts showing process procedures in the stall information detecting algorithm. First, initialization is effected (step S1). Type of the compiler is then confirmed (step S2). Option of the compiler is then confirmed (step S3). Then, the subsequently executed instruction x[n] is read from the source program sequence, and then (A) information indicating whether the instruction is the equation or the function, (B) instruction address Y[m] of the instruction, and (C) data address Z[l] of the data employed to execute the instruction are stored (step S4). Where the instruction address Y[m] and the data address Z[l] employed herein do not correspond to addresses in the main memory installed in the power consumption estimating system. The instruction address Y[m] and the data address Z[l] are addresses which are provided virtually in the power consumption estimating system. Such addresses are then employed to decide whether or not the instruction and the data were read in the past and stored in the instruction cache 17A or the data cache 17B. For convenience, assume that they are stored in the cache memory device provided in the power consumption estimating system.

Next, it is checked whether or not the instruction address Y[m] of the read instruction is equal to the instruction addresses ΣY[m-1] which are saved in the cache memory device (step S5). If they are equal (if YES in step S5), the instruction can be read from the instruction cache 17A in FIG. 3 and then executed. Then, Iflag=1 is set (step S6). In contrast, unless they are equal (if NO in step S5), the instruction can be read from the memory 16 in FIG. 3 and then executed. Then, Iflag=0 is set (step S7). Similarly, it is checked whether or not the data address Z[l] of the data employed by the read instruction is equal to the data addresses ΣZ[l-1] which are saved in the cache memory device (step S8). If they are equal (if YES in step S8), the data can be read from the data cache 17B in FIG.3 and then executed. Then, Dflag=1 is set (step S9). In contrast, unless they are equal (if NO in step S8), the data can be read from the memory 16 in FIG. 3 and then executed. Then, Dflag=0 is set (step S10).

Next, it is decided that the read instruction corresponds to the equation or the function (step S11).

(A) the case where it has been decided in step S11 that the instruction corresponds to the equation It is decided based on Iflag whether or not the instruction corresponding to this equation has been read from either the instruction cache 17A or the memory 16. Then, it is decided based on Dflag whether or not the data employed to execute the instruction has been read from either the data cache 17B or the memory 16 (step S12). In the case of Iflag=1 and Dflag=1, it is decided that the instruction is read from the instruction cache 17A and the used data are read from the data cache 17B (step S13). In the case of Iflag=1 and Dflag=0, it is decided that the instruction is read from the instruction cache 17A and the used data are read from the memory 16 (step S14). In the case of Iflag=0 and Dflag=1, it is decided that the instruction is read from the memory 16 and the used data are read from the data cache 17B (step S15). In the case of Iflag=0 and Dflag=0, it is decided that both the instruction and the used data are read from the memory 16 (step S16).

After read states of the instruction and the data have been classified, overflow of the instruction stored in the instruction cache 17A and the data stored in the data cache 17B is checked. If the instruction has been read from the instruction cache 17A, the same instruction address which was saved in the instruction cache 17A in the past is deleted (step S17). If the instruction has been read from the memory 16, the instruction being executed at this time is saved newly in the instruction cache 17A. In this case, it is checked whether or not the number $\Sigma Y[n]$ of the instruction address which is saved in the cache memory device is larger than 50 (step S18). If the number $\Sigma Y[n]$ is larger than 50 (if YES in step S18), the oldest instruction address is deleted from the cache memory device (step S19).

Then, it is checked based on Dflag whether the used data has been read from either the memory 16 or the data cache 17B (step S20). If the data has been read from the data cache 17B, the same data address which was saved in the data cache 17B in the past is deleted (step S21). If the data has been read from the memory 16, the data being executed at this time is saved newly in the data cache 17B. In this case, it is checked whether or not the number $\Sigma Z[l]$ of the data address which is saved in the cache memory device is larger than 10 (step S22). If the number $\Sigma Z[l]$ is larger than 10 (if YES in step S22), the oldest data address is deleted from the cache memory device (step S23).

(B) the case where it has been decided in step S11 that the instruction corresponds to the function The number M of instruction and the number L of data necessary for this function are calculated, and then they are increased (step S24).

Then, it is decided based on Iflag whether or not the instruction corresponding to this equation has been read from either the instruction cache 17A or the memory 16. In addition, it is decided based on Dflag whether or not the data employed to execute the instruction has been read from either the data cache 17B or the memory 16 (step S25). In the case of Iflag=1 and Dflag=1, it is decided that the instruction is read from the instruction cache 17A and the used data are read from the data cache 17B (step S26). In the case of Iflag=1 and Dflag=0, it is decided that the instruction is read from the instruction cache 17A and the used data are read from the memory 16 (step S27). In the case of Iflag=0 and Dflag=1, it is decided that the instruction is read from the memory 16 and the used data are read from the data cache 17B (step S28). In the case of Iflag=0 and Dflag=0, it is decided that both the instruction and the used data are read from the memory 16 (step S29).

After read states of the instruction and the data have been classified, overflow of the instruction group stored in the instruction cache 17A and the data group stored in the data cache 17B is checked. If the instruction has been read from the instruction cache 17A, the same instruction address which was saved in the instruction cache 17A in the past is deleted (step S30). If the instruction has been read from the memory 16, the instruction being executed at this time is saved newly in the instruction cache 17A. In this case, it is checked whether or not the number $\Sigma Y[n]$ of the instruction address which is saved in the cache memory device is larger than 50 (step S31). If the number $\Sigma Y[n]$ is larger than 50 (if YES in step S31), the instruction address is deleted from the cache memory device by the number of overflow from the oldest instruction address in sequence (step S32).

Then, it is checked based on Dflag whether the used data has been read from either the memory 16 or the data cache 17B (step S33). If the data has been read from the data cache 17B, the same data address which was saved in the cache memory device in the past is deleted (step S34). If the data has been read from the memory 16, the data being executed at this time is saved newly in the data cache 17B. In this case, it is checked whether or not the number $\Sigma Z[l]$ of the data address which is saved in the cache memory device is larger than 10 (step S35). If the number $\Sigma Z[l]$ is larger than 10 (if YES in step S35), the data address is deleted from the cache memory device by the number of overflow from the oldest data address in sequence (step S36).

Then, it is checked whether or not all instructions in the source program have been executed (step S37). Unless all instructions have been executed (if NO in step S37), a program counter (N) is incremented by one (step S38) and then the process returns to step S4. If all instructions have been executed (if YES step S37), the processes in this algorithm are completed.

In addition, the stall information detecting algorithm will be explained in more detail by using the trace information shown in FIG. 8. In this disclosure, assume that the programmer has decided to use the cc compiler and to compile according to normal option. Accordingly, after the initialization in step S1, "use of the cc compiler" is checked in step S2, then "normal option" is checked in step S3.

In step S4, first the instruction in the execution order 1 is read. Since this instruction is executed for the first time, the process advances to step S11 via the pass of step S5, step S7, step S8, and step S10. Since the instruction in the execution order 1 is the equation, the process goes to step S12. Then, since both the instruction and the data are read from the memory 16, the process goes to step S16 and step S18. Then, since the number $\Sigma Y[n]$ of the instruction address which is saved in the instruction cache 17A is smaller than 50, the process goes to step S20. Then, since the data are read from the memory 16, the process goes to step S22. It is checked whether or not the number $\Sigma Z[l]$ of the data address which is saved in the data cache 17B is larger than 10. Here, since the number $\Sigma Z[l]$ of the data address is less than 10, the process goes to step S37. Then, since all instructions have not executed yet, the process returns to step S4 again via step S38 and then process of the next instruction is started. The instruction in the execution order 2 is processed through the same path as the instruction in the execution order 1. Because the instruction in the execution order 3 is also executed for the first time, the process advances up to step S11, as in the instruction in the execution order 1. Since the instruction in the execution order 3 is the function, the process goes to step S24. In step S24, the number M of instruction and the number L of data necessary for the function are calculated and then they are incremented. Since the instruction in the execution order 3 employs 12 instructions and 2 data, the number of instruction is increased by (12−1)=11 and the number of data is increased by (2−1)=1. In turn, the process goes to step S25. Since both the instruction and the data are read from the memory 16, the process advances to step S29 and step S31. Because the number ΣY[n] of the instruction address which is saved in the instruction cache 17A is smaller than 50, the process goes to step S33. Then, since the data has been read from the memory 16, the process goes to step S35. Then, because the number ΣZ[1] of the data address which is saved in the data cache 17B is less than 10, the process goes to step S37, step S38, and step S5.

The instructions in the execution order 4 and the execution order 7 are processed via the same path as the instruction in the execution order 1. The instructions in the execution order 5 and the execution order 6 are processed via the same path as the instruction in the execution order 3.

The instruction in the execution order 3' is decided in step S5 such that its instruction address is equal to the instruction address which is saved in the cache memory device and thus such instruction in the execution order 3' is identical to the instruction being executed in the past. Then, a flag is set (Iflag=1) in step S6, the process goes to step S8. In step S8, since the data have already been stored in the data cache 17B, the process goes to step S9. Then, a flag is set (Dflag=1) and then the process goes to step S11. Since the instruction is the function, the process goes to step S25 via step S24. In this case, both the instruction and the data are read from the cache memory, the process advances to step S26 and step S30. In step S30, the same instruction address group employed in the past is deleted and then the process goes to step S33 and step S34. In step S34, the same data address group employed in the past is deleted. Then, the process returns to step S4 via step S37 and step S38.

The instruction in the execution order 4' is processed via the same path as the instruction in the execution order 3' and the process goes from step S4 to step S11. Since the instruction is the equation, the process goes to step S12. Then, since both the instruction and the data are read from the cache memory 17A, 17B, the process goes to step S13 and step S17. In step S17, the same instruction address employed in the past is deleted and then the process goes to step S20 and step S21. In step S21, the same data address employed in the past is deleted. Then, the process returns to step S4 via step S37 and step S38.

The instruction in the execution order 5' is processed via the same path as the instruction in the execution order 3. The instruction in the execution order 6' is processed via the same path as the instruction in the execution order 3. The instruction in the execution order 7' is processed via the same path as the instruction in the execution order 4'.

The instruction in the execution order 3" is processed via the same path as the instruction in the execution order 3' and the process goes to step S37. Since this instruction is the final instruction, this algorithm has been completed. In this manner, the stall information detecting algorithm adds the stall information to the trace information.

As described above, according to the first embodiment of the present invention, it is possible for the programmer to estimate the power consumption in the processor directly based on the source program being described by the programmer. Therefore, estimated result of the power consumption can be get quickly with high precision. Also, the programmer can get an estimation result of the power consumption in the course of programming, so that the programmer can describe easily the program in consideration of the low power consumption.

If the instruction is the function and the branch instruction and the loop are contained in the function, in many cases the necessary number of cycle and the power consumption are not decided uniquely in execution of the instruction unless the simulation is performed actually. Hence, the power consumption library 15B for one equation/ one function shown in FIG. 12 may be replaced with a maximum/ minimum power consumption library in which the maximum value and the minimum value are shown in FIG. 15. If the maximum/minimum power consumption library for one equation/one function in FIG. 15 is employed, it is possible to detect the maximum power consumption, which can derived by adding the maximum value of the power consumption for each instruction, and the minimum power consumption, which can derived by adding the minimum value of the power consumption for each instruction, respectively. For example, in the case of the source program sequence shown in FIG. 7, the maximum and minimum power consumption shown in FIG. 16 can be detected by using the data in the maximum/minimum power consumption library in FIG. 15. Hence, even if the power consumption for each instruction cannot estimated uniquely, at least the maximum value and the maximum value of the power consumption can be calculated. Accordingly, it is feasible to set an upper limit and a lower limit of the power consumption in the processor. Also, if this information is fed back to the programmer, the programmer can improve the program effectively in the middle of programming.

(Second Embodiment)

Figure 17:
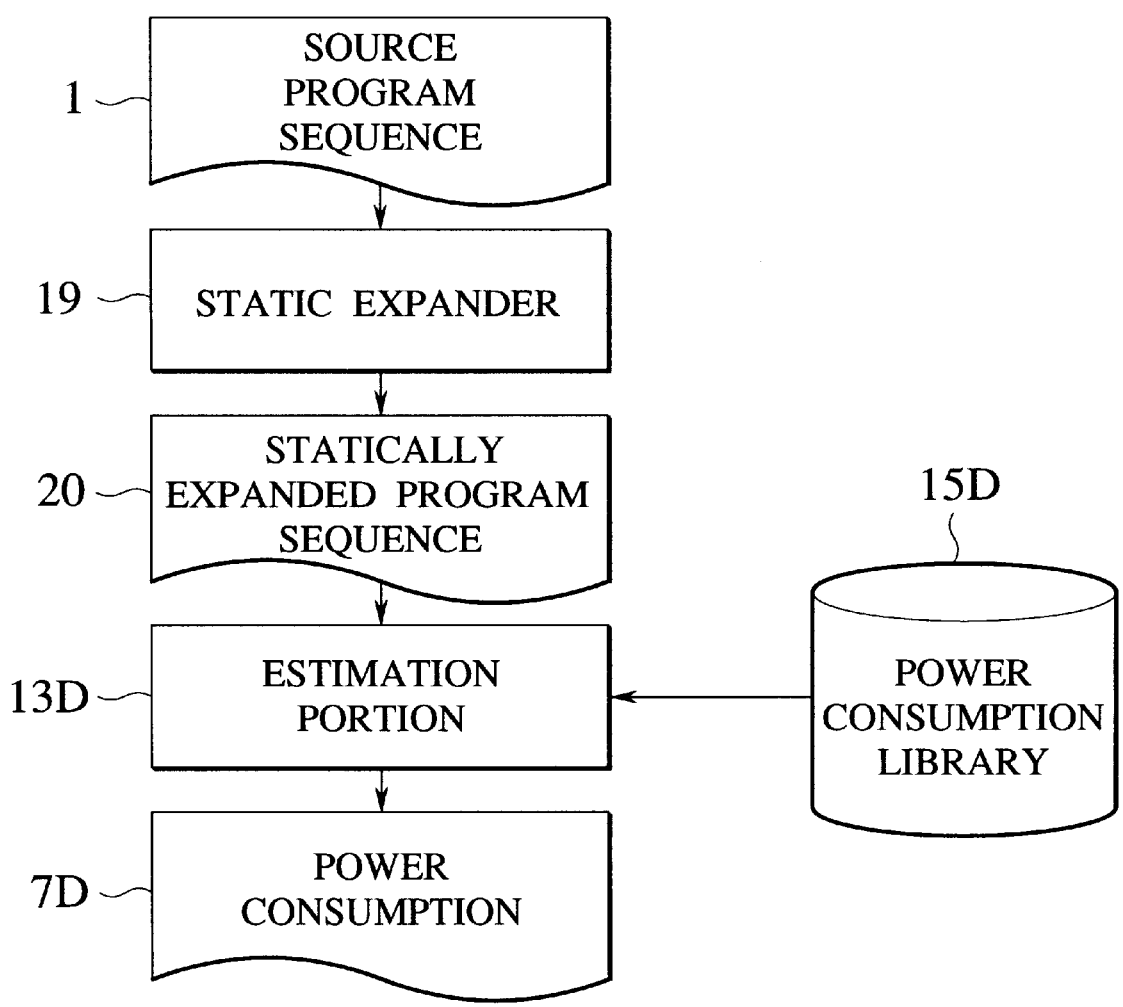
FIG. 17 is a block diagram showing a configuration of a processor power consumption estimating system according to a second embodiment of the present invention.

FIG. 17 is a block diagram showing a configuration of a processor power consumption estimating system according to a second embodiment of the present invention. The power consumption estimating system according to the second embodiment of the present invention comprises a static expander 19 for receiving the source program sequence 1 of the function level and then statically expanding the source program sequence 1, and an estimation portion 13D for receiving a statically expanded program sequence 20 and then calculating the power consumption based on a power consumption library 15D for one equation/ one function when the execution program is executed.

In the second embodiment of the present invention, information such as branch probability, jump probability, loop number of times, etc., which are requested to expand the source program sequence 1 from the outside, are given. Then, it is decided by using them that the instruction and the data employed to execute the instruction are read from either the instruction cache 17A/the data cache 17B or the memory 16. Based on the decision result, the static expander 19 statically expands the source program sequence 1. That is, it is possible to expand the source program sequence 1 without the actual simulation. For instance, in the source program sequence employed in the above first embodiment shown in FIG. 7, the loop number in the source program sequence is designated as "loop number=2" from the outside. Thus, the program sequence 20 which is statically expanded without the actual simulation, i.e., the trace information shown in FIG.8 can be obtained. Then, like the first embodiment, the estimation portion 13D receives the program sequence 20 which is statically expanded and then calculates the power consumption for each instruction by referring to the data being stored in the power consumption library 15D for one equation/one function. Then, the estimation portion 13D adds the power consumption for each instruction, which is calculated, and then outputs the power consumption 7D of the microprocessor. Therefore, even in the stage where variable values employed in the source program are not defined, it is possible to estimate the power consumption in the processor. In addition, since the trace information can be obtained without execution of the simulation, higher speed estimation of the power consumption can be achieved. Moreover, it is possible to estimate the power consumption for the unfinished source program to which the simulation cannot be applied.

(Third Embodiment)

Figure 18:
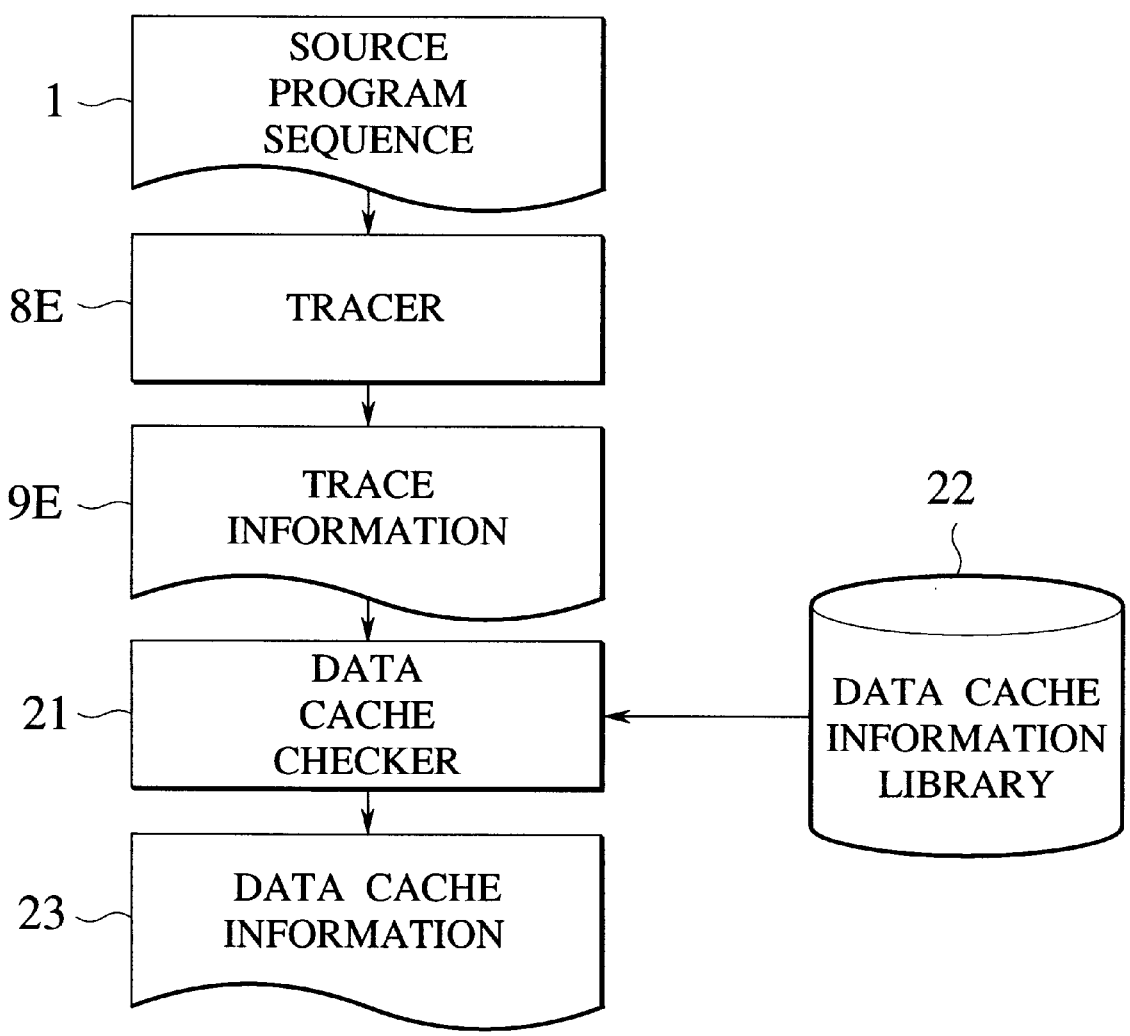
FIG. 18 is a block diagram showing a configuration of a data cache information detecting system provided in a processor power consumption estimating system according to a third embodiment of the present invention.

Next, a third embodiment of the present invention will be explained hereunder. In a processor power consumption estimating system according to the third embodiment of the present invention, a data cache information detecting system which detects cache information of the data cache from the source program is provided to the processor power consumption estimating system according to the first or second embodiment. FIG. 18 is a block diagram showing a configuration of the data cache information detecting system provided in the processor power consumption estimating system according to the third embodiment of the present invention. This data cache information detecting system comprises a tracer 8E for receiving the source program sequence 1 of the function level and then generating trace information 9E of the source program sequence 1, and a data cache checker 21 for receiving the trace information 9E and then detecting data cache information 23 by referring to a data cache information library 22 for one equation/one function. In respective equations/functions employed in the source program, the data stored as the data cache information library 22 are a total number of data which are referred to by the equation/function, type of referred data, referring timings of data, and order and type of the data which are stored in the data cache after the equation/function have been executed. As the type of referred data, for example, there are internal data which are employed in the inside of only one equation/function and global data which are employed in the inside of a plurality of equations/functions.

Next, a particular example of an operation of the data cache information detecting system according to the third embodiment of the present invention will be explained with reference to the drawings hereinbelow. Here, the case where three instructions A, B, C shown in FIG. 19 are executed in the execution order shown in FIG. 20 will be explained as an example. To begin with, the tracer 8E receives the source program sequence 1. Then, the tracer 8E executes the instructions one by one to expand the received source program sequence 1 and then detects the trace information 9E which indicates the execution order by which these instructions should be executed. Then, the data cache checker 21 receives the trace information 9E which are output from the tracer 8E and then detects the data cache information 23 by referring to the data stored in the data cache information library 22 for one equation/ one function. The data cache checker 21 detects the data cache information 23 by using the data cache information detecting algorithm.

Figure 21:
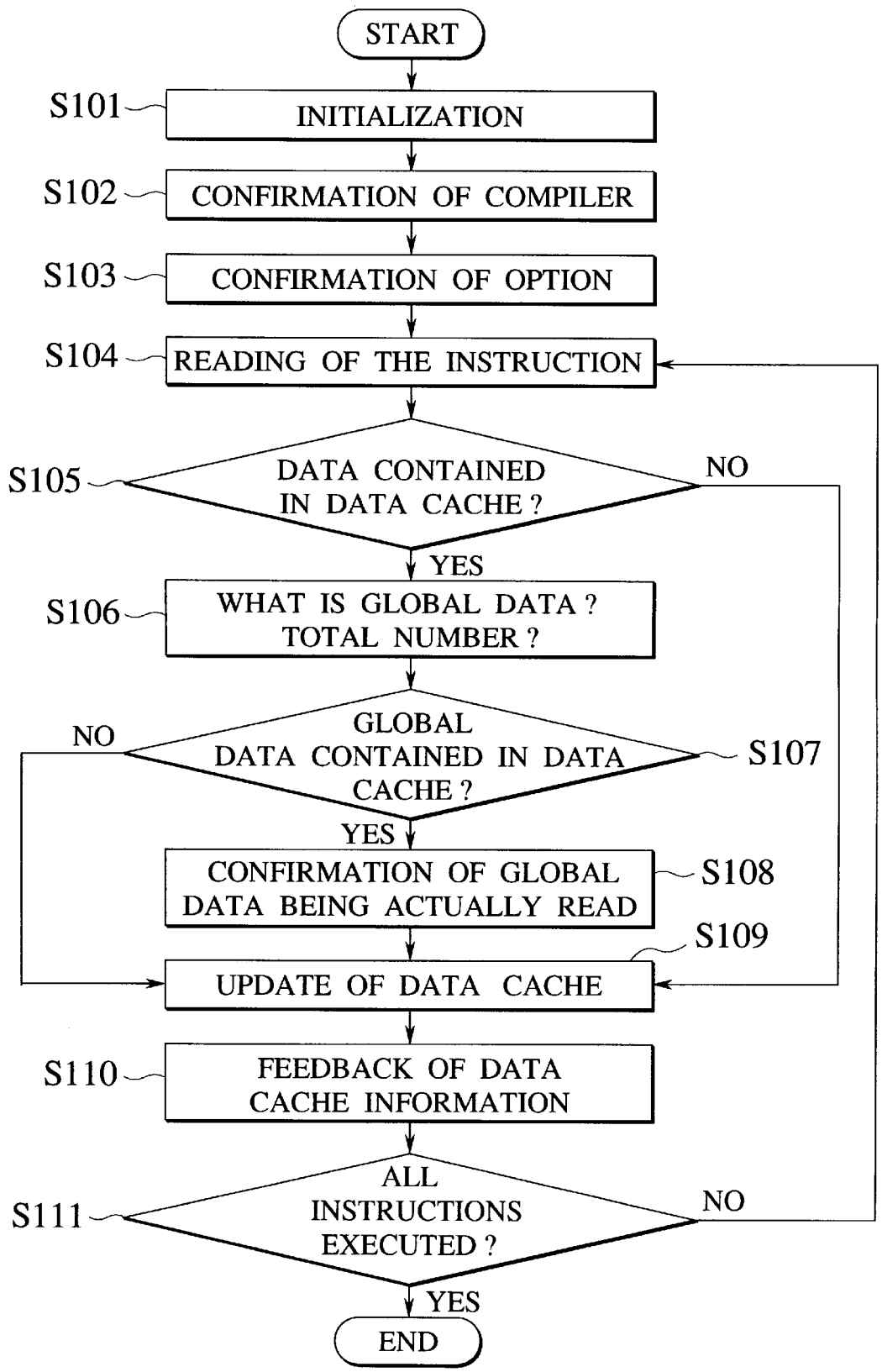
FIG. 21 is a flowchart showing process procedures in a data cache information detecting algorithm employed in the third embodiment of the present invention.

FIG. 21 is a flowchart showing process procedures in the data cache information detecting algorithm employed in the third embodiment of the present invention. At first, initialization is carried out (step S101), then type of the compiler is confirmed (step S102), and then option of the compile is confirmed (step S103). In this disclosure, assume that the programmer has decided to use the cc compiler and to compile according to normal option. Accordingly, after the initialization in step S101, "use of the cc compiler" is checked in step S102, then "normal option" is checked in step S103. Then, the next executed instruction is read and then it is checked which one of the equation and the function such instruction corresponds to (step S104). In the program shown in FIG. 19, since the instruction A is executed at first, the instruction A is read for the first time and recognized. It is checked whether or not the data are contained in data cache (step S105). Since the instruction A is the first instruction which is executed for the first time, no data is contained in the data cache (if NO in step 105). Accordingly, the process goes to step S109. The state of the data cache derived when execution of the instruction A has been terminated is detected from FIG. 19, and the data cache is updated into such state (step S109). Then, information indicating that data cache miss is caused in the global data Y, Z are fed back to the programmer (step S109). It is decided whether or not all instructions have been executed (step S111). Here, since the succeeding instruction is present (if NO in step 111), the process returns to step S104.

Then, the instruction B is read and then checked (step S104). Then, since the data has already been contained in the data cache (if YES in step S105), then it is checked which data is the global data employed in the instruction B, and a total number of the global data is checked (step S106). More specifically, it is confirmed from FIG. 19 that the global data employed in the instruction B are three data X, Y, Z (step S107). Then, it is checked whether or not the global data X, Y, Z are contained in the data cache (step S107). Since the data Y is contained (if YES in step S107), it is checked whether or not the data Y can be read actually from the data cache when the instruction B is executed (step S108). More particularly, FIFO (first-in first-out) is carried out based on the data shown in FIG. 19. In this case, the data Y is canceled from the data cache before the data Y is employed by the instruction B, and thus not used. That is, the cache miss is caused. Then, the state of the data cache is detected from FIG. 19 when the execution of the instruction B is terminated, and then the data cache is updated into its state (step S109). Then, information concerning that the cache miss is caused by the global data X, Y, Z are fed back to the programmer (step S110).

Then, it is decided whether or not all instructions have been executed (step S111). Here, since the succeeding instruction is contained, the process goes to step S104 once again. The instruction C is read and confirmed (step S104). Since the data have been contained in the data cache (if YES in step S110), then it is checked which data is the global data employed in the instruction C, and a total number of the global data is checked (step S106). Since the global data of the instruction C is merely data Z and also the data Z is contained in the data cache (if YES in step S107), the process advances to step S108. Then, it is checked whether or not the data Z can be read actually from the data cache when the instruction C is executed (step S108). Here, the data Z are available. After the data cache is updated (step S109), information indicating that the global data Z causes data cache hit is fed back to the programmer (step S110). Then, it is decided whether or not all instructions have been executed and then the process is terminated since the succeeding instruction is not contained (if YES in step S111).

Based on the data cache information thus derived, the programmer can know the data which causes the data cache miss and the number of such data. Accordingly, for example, if there is no influence upon the execution result, the execution order shown in FIG. 20 can be modified, the cache miss can be improved, influence upon other data caused by this improvement can be checked once again. Therefore, it is possible to reduce the power consumption due to improvement in the cache miss. For instance, if the instruction which employs the data shown in FIG. 19 is executed in the execution order shown in FIG. 20, internal state of the data cache is changed, as shown in FIG. 22. As evident from FIG. 20, the cache miss of the global data is caused six times. In the event that there is no influence upon the execution result even when the execution order of the instruction is changed, internal state of the data cache is changed as shown in FIG. 24 if the instruction is executed in the execution order shown in FIG. 23, for example. In this case, the number of times of the data cache miss can be reduced to five. For this reason, the power consumption of the processor can be reduced by reducing the data cache miss in this way.

(Other Embodiment)

For the processor power consumption estimating system according to the first to third embodiments of the present invention, the normal computer system can be employed. In this computer system, so-called general-purpose machine, workstation, PC, NC (Network Computer), etc. are included. The computer system employed in the power consumption estimating system according to the above first to third embodiments comprises a CPU for executing various processes, an input device such as a keyboard, a mouse, a light pen, a flexible disk device, etc., an external memory device such as a memory device, a disk device, etc., and an output device such as a display device, a printer device, etc.

Further, in the processor power consumption estimating system according to the above first to third embodiments, GUI (graphical user interface) for displaying the estimated result of the power consumption and the data cache miss information to the programmer can be provided.

Figure 29:
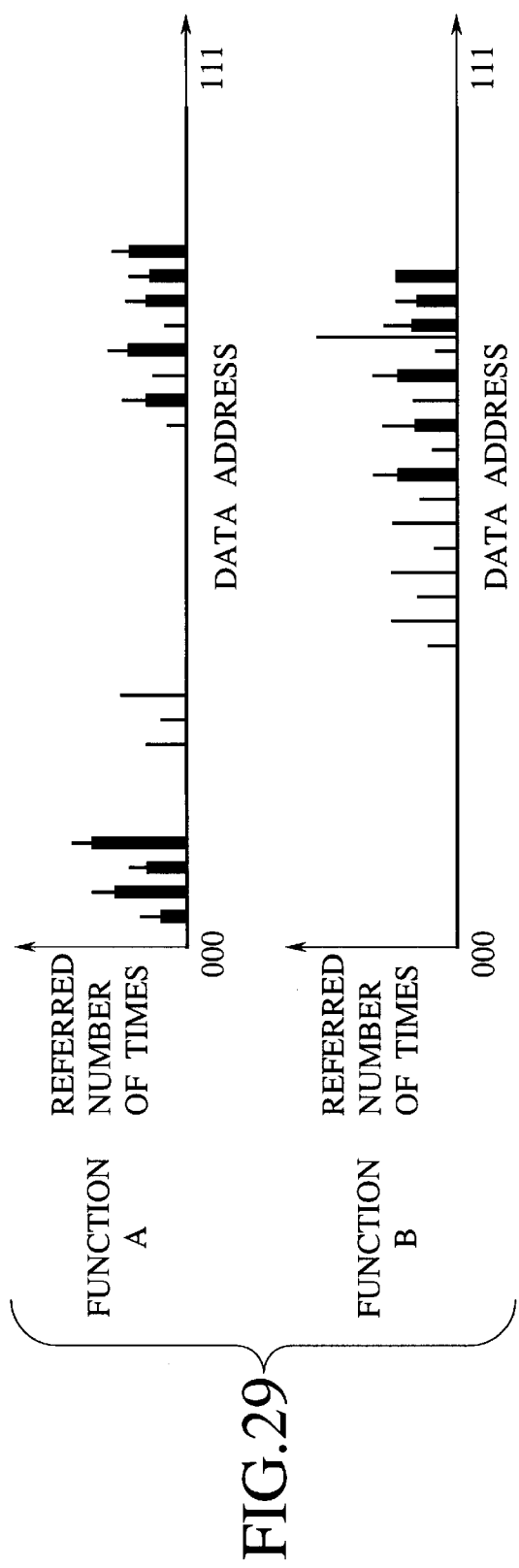
FIG. 29 is a view showing a first example of data cache miss information displayed by using GUI.
Figure 30:
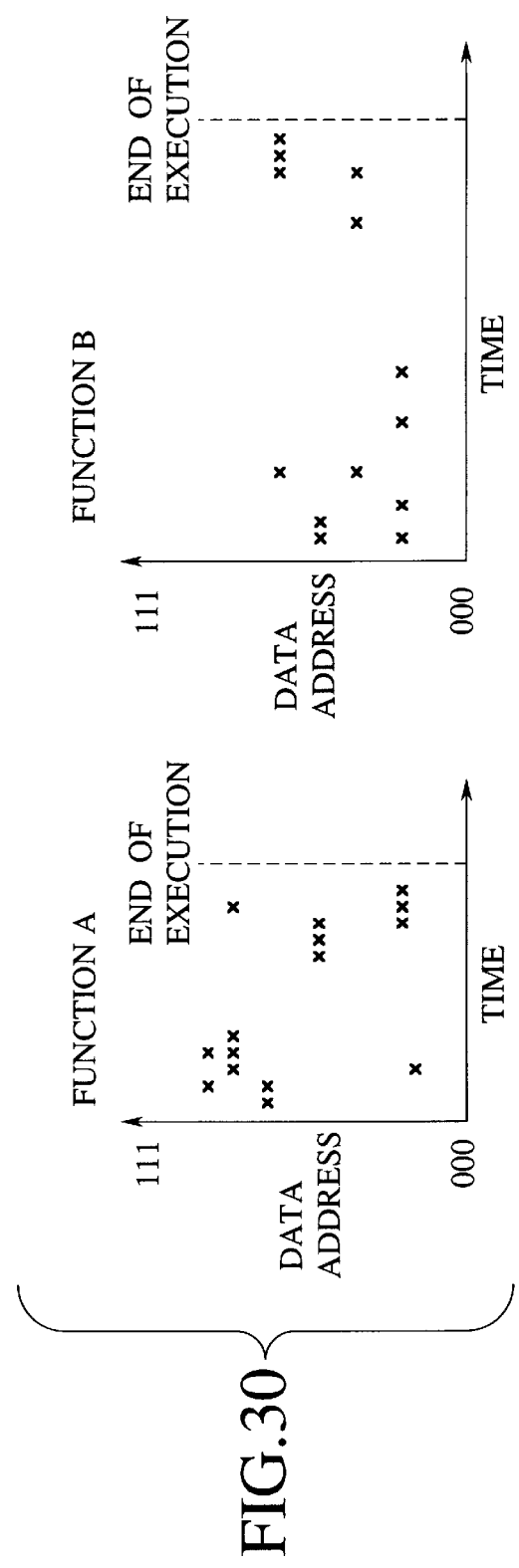
FIG. 30 is a view showing a second example of the data cache miss information displayed by using GUI.

FIG. 25 is a view showing a first example of the estimated result of the power consumption displayed by using GUI. In this first example, the power consumption being consumed by the instructions are displayed one by one relative to respective instructions after the trace has been expanded. FIG. 26 is a view showing a second example of the estimated result of the power consumption displayed by using GUI. In this second example, an occurring frequency of respective instructions prior to trace expansion, maximum/minimum power consumption which is consumed every time when the instruction is executed once, and a product of the occurring frequency and the maximum/minimum power consumption (total power consumption) are displayed. FIG. 27 is a view showing a third example of the estimated result of the power consumption displayed by using GUI. In this third example, the occurring frequency of the instruction before the trace expansion, a frequency of the data cache miss being caused by the instruction, and the power consumption which is estimated with regard to the occurring frequency of the instruction and the frequency of the data cache miss are displayed. FIG. 28 is a view showing a fourth example of the estimated result of the power consumption displayed by using GUI. In this fourth example, if the instruction using a hierarchical structure is employed, more detail information can be get by designating the instruction. FIG. 29 is a view showing a first example of data cache miss information displayed by using GUI. In FIG. 29, data addresses employed by the function A and the function B (thin lines in FIG. 29), referred number of times of the function A and the function B, and data addresses at which the data cache miss are caused (thick lines in FIG. 29) are displayed. FIG. 30 is a view showing a second example of the data cache miss information displayed by using GUI. In FIG. 30, data addresses employed by the function A and the function B and using timings thereof are displayed. In this manner, the programmer can execute easily the operation to monitor the estimated result of the power consumption and the data cache information, or to work them by pointing the icon or the menu item on the display screen by using the GUI. In addition, the programmer can analyze information more effectively and feed back the analyzed result to the programming operation.

Also, the program for implementing the above processor power consumption estimating method can be stored in the storage medium. The contents of this storage medium is installed into the computer system, and then the processor power consumption estimating method can be accomplished while controlling the computer system by executing the program. As the storage medium, there may be employed, for example, a memory device, a magnetic disk drive, an optical disk drive, etc. if they can store the program. Such program can be written in any conventional software language known to those skilled in the art including C, C++ or FORTRAN. Such conventional software languages generally include a compiler which generates machine-executable code from the higher level programming instructions.

Various modifications will become possible for those skilled in the art after receiving the teaching of the present disclosure without departing from the scope thereof.

What is claimed is:

1. A power consumption estimating system for estimating power consumption in a processor when instructions contained in an execution program are executed, comprising:
   (a) means for tracing a source program of the execution program;
   (b) means for receiving trace information and detecting whether or not the processor is put into a stall when the instructions are executed; and
   (c) means for receiving trace information to which stall information is added and estimating power consumption when the instructions are executed;
   wherein the detecting means detects the stall information by looking up operation information of the processor, and
   the estimating means estimates the power consumption in the processor by looking up a library in which power consumption for each instruction is collected with regard to the stall information.

2. A power consumption estimating system for estimating power consumption in a processor, according to claim 1, further comprising:
   means for receiving the source program; and
   means for outputting an estimated result of the power consumption.

3. A power consumption estimating system for estimating power consumption in a processor, according to claim 2, wherein the processor includes
   a core for executing the instructions,
   a memory for storing the instructions,
   an instruction cache for storing a part of the instructions, and
   a data cache for storing a part of data employed in the instructions.

4. A power consumption estimating system for estimating power consumption in a processor, according to claim 3, wherein the stall information includes information for indicating which one of the memory and the instruction cache the instructions are stored in, and information for indicating which one of the memory and the data cache the data employed in instruction execution are stored in.

5. A power consumption estimating system for estimating power consumption in a processor, according to claim 1, further comprising:

means for searching data cache information of the data employed when the instructions are executed;

wherein the data cache information contain information indicating the data which cause data cache miss and a number of the data.

6. A power consumption estimating system for estimating power consumption in a processor, according to claim 5, wherein the data cache information searching means includes means for receiving the source program, means for tracing the source program, means for receiving the trace information and detecting the data cache information when the instructions are executed, and means for outputting the data cache information, wherein the data cache information detecting means has a data cache information library, and the data cache information library contains information of a total number of the data which are looked up by the instructions, types of the data to be looked up, timings for looking up the data, and sequences and types of the data stored in the data cache after the instructions have been executed.

7. A power consumption estimating system for estimating power consumption in a processor when instructions contained in an execution program are executed, comprising:

(a) means for statically expanding a source program of the execution program; and (b) means for receiving the source program which has been expanded statically and estimating power consumption when the instructions are executed;

wherein the statically expanding means has information necessary for expansion of the source program and expands the source program based on expansion information, and the estimating means estimates the power consumption in the processor with reference to a library in which the power consumption for each instruction is collected with regard to information indicating whether or not the processor is put into a stall when the instructions are executed.

8. A power consumption estimating system for estimating power consumption in a processor, according to claim 7, wherein the expansion information includes information indicating branch probabilities, jump probabilities, and loop number of times of the instructions.

9. A power consumption estimating system for estimating power consumption in a processor, according to claim 7, further comprising:

means for receiving the source program; and means for outputting an estimated result of the power consumption.

10. A power consumption estimating system for estimating power consumption in a processor, according to claim 9, wherein the processor includes a core for executing the instructions, a memory for storing the instructions, an instruction cache for storing a part of the instructions, and a data cache for storing a part of data employed in the instructions.

11. A power consumption estimating system for estimating power consumption in a processor, according to claim 10, wherein the stall information includes information for indicating which one of the memory and the instruction cache the instructions are stored in, and information for indicating which one of the memory and the data cache the data employed in instruction execution are stored in.

12. A power consumption estimating system for estimating power consumption in a processor, according to claim 7, further comprising:

means for searching data cache information of the data employed when the instructions are executed;

wherein the data cache information contain information indicating the data which cause data cache miss and a number of the data.

13. A power consumption estimating system for estimating power consumption in a processor, according to claim 12, wherein the data cache information searching means includes means for receiving the source program, means for tracing the source program, means for receiving the trace information and detecting the data cache information when the instructions are executed, and means for outputting the data cache information, wherein the data cache information detecting means has a data cache information library, and the data cache information library contains information of a total number of the data which are looked up by the instructions, types of the data to be looked up, timings for looking up the data, and sequences and types of the data stored in the data cache after the instructions have been executed.

14. A power consumption estimating method of estimating power consumption in a processor when instructions contained in an execution program are executed, comprising the steps of:

(a) receiving a source program of the execution program;

(b) tracing the source program;

(c) receiving trace information and detecting whether or not the processor is put into a stall when the instructions are executed;

(d) receiving trace information to which stall information is added and estimating power consumption when the instructions are executed; and (e) outputting an estimated result of the power consumption;

wherein the stall information are detected by looking up operation information of the processor in the detecting step, and the power consumption in the processor is estimated by looking up a library, in which power consumption for each instruction is collected with regard to the stall information, in the estimating step.

15. A storage medium storing a power consumption estimating program which estimates power consumption in a processor when instructions contained in an execution program are executed, the program comprising the steps of:

(a) receiving a source program of the execution program;
(b) tracing the source program;
(c) receiving trace information and detecting whether or not the processor is put into a stall when the instructions are executed;
(d) receiving trace information to which stall information is added and estimating power consumption when the instructions are executed; and
(e) outputting an estimated result of the power consumption;

wherein the stall information are detected by looking up operation information of the processor in the detecting step, and the power consumption in the processor is estimated by looking up a library, in which power consumption for each instruction is collected with regard to the stall information, in the estimating step.

* * * * *